US007123846B2

(12) United States Patent
Tateyama et al.

(10) Patent No.: US 7,123,846 B2
(45) Date of Patent: Oct. 17, 2006

(54) OPTICAL RECEIVING DEVICE, WAVEFORM OPTIMIZATION METHOD FOR OPTICAL DATA SIGNALS, AND WAVEFORM OPTIMIZATION PROGRAM FOR OPTICAL DATA SIGNALS

(75) Inventors: Tetsuo Tateyama, Tokyo (JP); Takashi Kuriyama, Tokyo (JP); Yoshihiro Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 405 days.

(21) Appl. No.: 10/196,193

(22) Filed: Jul. 17, 2002

(65) Prior Publication Data
US 2003/0016605 A1  Jan. 23, 2003

(30) Foreign Application Priority Data
Jul. 18, 2001 (JP) ............................. 2001-217664

(51) Int. Cl.
*H04B 10/06* (2006.01)
*H04B 10/18* (2006.01)
(52) U.S. Cl. .................... 398/209; 398/147; 398/159
(58) Field of Classification Search ............. 369/47.35, 369/53.31, 53.32, 53.33, 53.34, 53.35, 59.17, 369/59.19, 47.44, 53.12, 53.18, 53.42, 53.44, 369/47.25, 47.26, 47.27, 47.28; 398/81, 398/147, 148, 159, 202, 155, 208–209, 212–213, 398/82
See application file for complete search history.

(56) References Cited
U.S. PATENT DOCUMENTS
3,662,354 A * 5/1972 Chertok ...................... 369/59.1

| 4,414,668 | A | * | 11/1983 | Iwasaki | ..................... 369/47.26 |
| 5,297,164 | A | * | 3/1994 | McCabe | ...................... 375/224 |
| 5,541,909 | A | * | 7/1996 | Nakajima et al. | ........ 369/275.1 |
| 5,703,852 | A | * | 12/1997 | Kumagai | .................... 369/53.3 |
| 6,172,959 | B1 | * | 1/2001 | Sano et al. | .............. 369/53.11 |
| 6,477,125 | B1 | * | 11/2002 | Hayami | .................... 369/47.35 |

FOREIGN PATENT DOCUMENTS

| JP | 59065936 A | * | 4/1984 |
| JP | 62229529 A | * | 10/1987 |
| JP | 02-007745 | | 1/1990 |
| JP | 05-075653 | | 3/1993 |
| JP | 05234254 A | * | 9/1993 |
| JP | 09-326755 | | 12/1997 |
| JP | 2000-115077 | | 4/2000 |

OTHER PUBLICATIONS

Machine Translation of Tomizawa et al. (JP 09-326755).*
Japanese Office Action dated Mar. 22, 2005, with partial English translation.
Japanese Office Action dated Jun. 30, 2005, with partial English Translation.

* cited by examiner

*Primary Examiner*—Leslie Pascal
(74) *Attorney, Agent, or Firm*—McGinn IP Law Group, PLLC

(57) ABSTRACT

This optical receiving device for discriminating and recovering a data signal, which results from converting an optical signal input through a dispersion equalizer into an electrical signal and amplifying it to a pre-determined amplitude, by using a clock and data recovery circuit for discriminating a data signal at the decision point controlled to achieve the optimum position controls the dispersion characteristics of a dispersion equalizer so that the error count in the recovered data signal by using a clock and data recovery circuit will be minimized by controlling the eye pattern of the data signal which has been amplified to a pre-determined amplitude.

32 Claims, 30 Drawing Sheets

$Cm < Cmin, Cs < Cmin$ $Cmax > Cm > Cs > Cmin$

RECEIVING LIGHT WAVEFORM IMMEDIATELY
AFTER TRANSMISSION

RECEIVING LIGHT WAVEFORM AFTER
TRANSMISSION OVER A DISTANCE OF 600km
AVERAGE RECEIVING LIGHT POWER − 24 [dBm]

FIG. 37 (PRIOR ART)
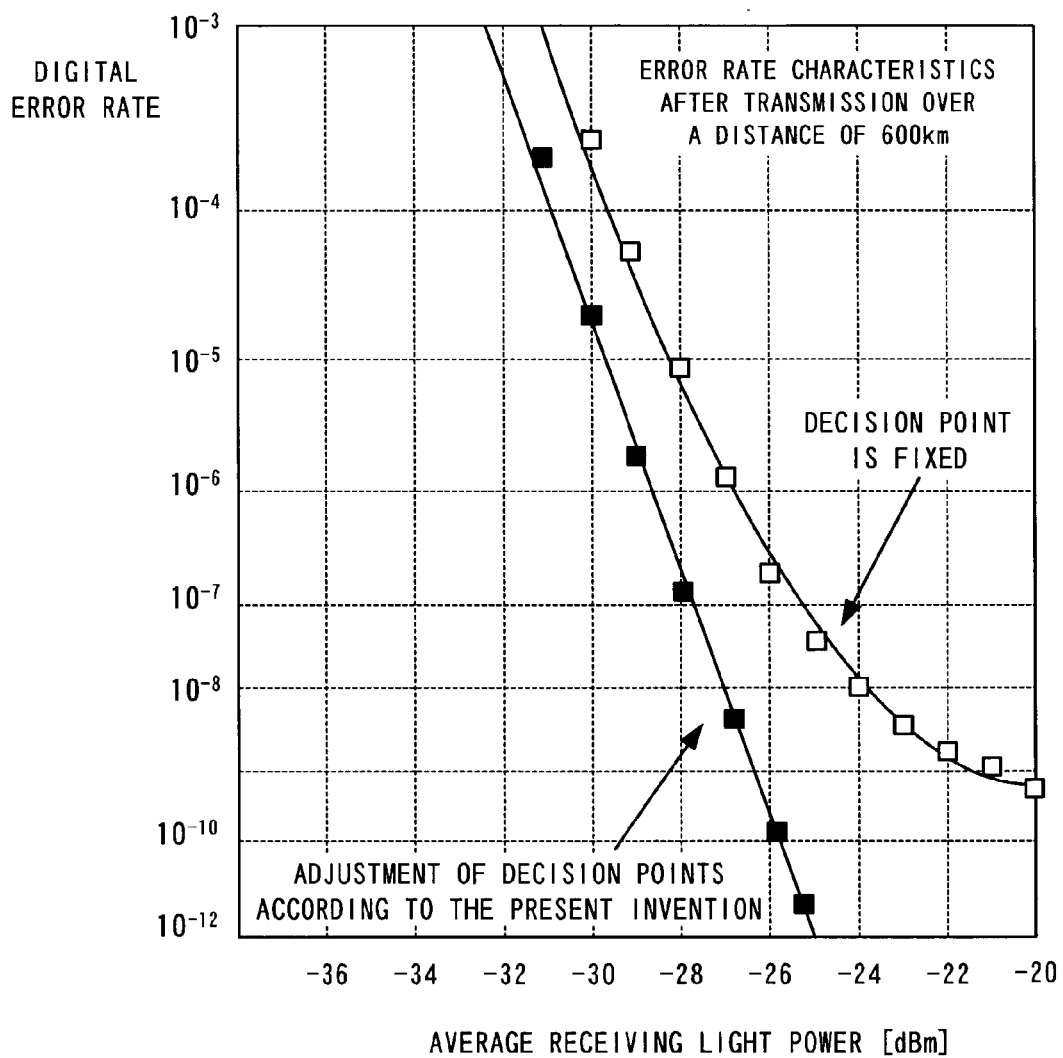
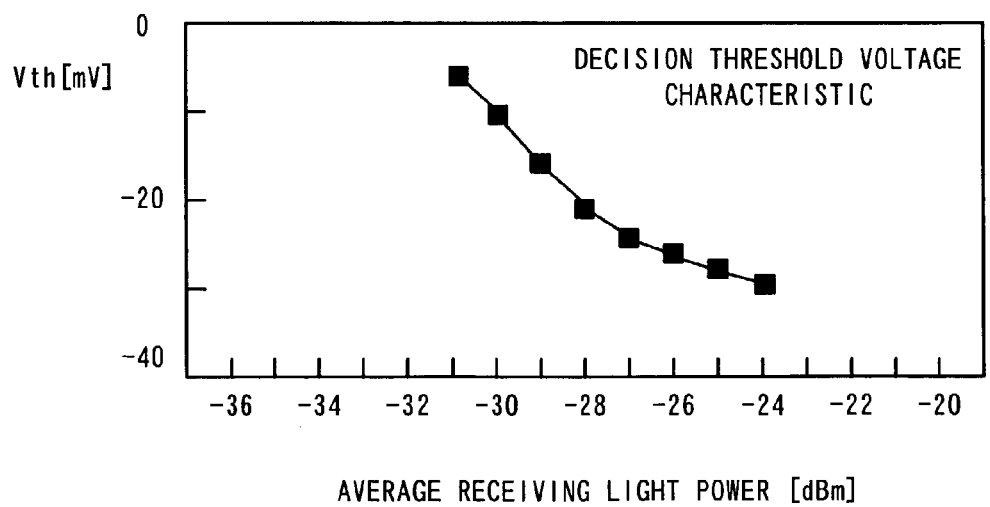

OPTICAL RECEIVING DEVICE, WAVEFORM OPTIMIZATION METHOD FOR OPTICAL DATA SIGNALS, AND WAVEFORM OPTIMIZATION PROGRAM FOR OPTICAL DATA SIGNALS

BACKGROUNDS OF THE INVENTION

1. Field of the Invention

The present invention relates to an optical receiving device, a waveform optimization method for optical data signals, and a waveform optimization program for optical data signals. More particularly, the present invention relates to an optical receiving device that is designed to minimize waveform deterioration in optical data signals, a waveform optimization method for optical data signals, and a waveform optimization program for optical data signals.

2. Description of the Related Art

Recent optical transmission systems incorporating optical amplifiers and the technology of WDM (wavelength division multiplexing) have more factors that may cause a deterioration in optical receive waveform than conventional optical transmission systems.

One example of factors that may cause a deterioration in optical receive waveform is the accumulation of noise, resulting from ASE (amplified spontaneous emission) from optical fiber amplifiers. Other examples are the dispersion and non-linear effects of optical fibers, whose influence has become more significant as optical signal power within optical fibers has increased. In WDM, such an increase in waveform deterioration is often caused by crosstalk interference from adjacent channels.

In the past, this problem was alleviated through provisions on the receiving device side by, for example, optimizing decision threshold positions in a CDR (clock and data recovery circuit). In order to further improve receiving sensitivity, however, these provisions are not sufficient, but the compensation of waveform deterioration itself must be addressed.

In an optical transmission system, the optical receive waveform of a signal has quite a large eye opening, which is an area where optical input data signals can be discriminated accurately between 1 and 0, immediately after the signal is sent out, as shown in FIG. 35. After a transmission over a distance of 600 km, however, the eye opening in the optical receive waveform is very small, as shown in FIG. 36.

The discrimination circuit of an optical receiving device is required to perform optimum discrimination in the presence of such deterioration in optical receive waveform. The optimum value for a decision threshold position, at which 1 or 0 is discriminated, also varies with light receiving power, because the eye opening in an optical receive waveform varies with light receiving power. As far as conventional optical transmission lines are concerned, the issue of the light receiving power is negligible in practical use. The decision threshold position can be chosen from a relatively broad range without causing the deterioration of optical receive waveform, and thus the decision threshold position could be fixed at any value pre-determined as appropriate by the manufacturer before shipment.

As described above, it is necessary to compensate waveform deterioration directly in order to improve receiving sensitivity in the presence of the waveform deterioration resulting from the dispersion of optical fibers, one of the factors for waveform deterioration.

Furthermore, for a typical optical transmission system incorporating an optical amplifier and WDM, it is difficult to maintain the quality of a transmission line by using a conventional discrimination circuit with a fixed decision threshold position. This is because the increased number of factors that are responsible for deterioration in optical receive waveform as described above causes a discrimination circuit to inherently suffer from a curve (floor) in error rate characteristic (see the upper diagram of FIG. 37).

SUMMARY OF THE INVENTION

In light of these circumstances, the first object of the present invention is to provide an optical receiving device with capabilities for dispersion equalization, which can optimize optical waveform by controlling the dispersion characteristics of a variable dispersion equalizer for controlling the disperse value to remain at a desired value, a method for optimizing the waveform of optical data signals, and a program for optimizing the waveform of optical data signals.

The second object of the present invention is to propose an optical receiving device comprising a decision threshold voltage feeding-capable CDR (clock and data recovery circuit) that can optimize optical waveform and achieve higher discrimination accuracy by controlling decision threshold positions at different light receiving levels.

The third object of the present invention is to propose an optical receiving device comprising a decision threshold voltage feeding-capable CDR that can optimize optical waveform and control a central decision point to achieve the optimum position by detecting the inner edges of an eye opening.

The fourth object of the present invention is to propose an optical receiving device comprising a decision threshold voltage feeding-capable CDR that can improve measuring accuracy and escape from an adverse condition quickly because it can adjust the measuring time based on the measuring results from an error counting part.

The fifth object of the present invention is to propose an optical receiving device comprising a decision threshold voltage feeding-capable CDR that can eliminate the necessity of using an unnecessarily large counter because it can change the measuring time according to the measured error count.

According to one aspect of the invention, an optical receiving device for discriminating and recovering a data signal, which results from converting an optical signal input through a dispersion equalizer into an electrical signal and amplifying it to a pre-determined amplitude, by using a clock and data recovery circuit for discriminating a data signal at the decision point controlled to achieve the optimum position, comprises controlling the dispersion characteristics of the dispersion equalizer so that the error count in the data signal recovered by the clock and data recovery circuit is minimized, by controlling the eye pattern of the data signal that has been amplified to a pre-determined amplitude.

In the preferred construction, the optical receiving device comprises waveform optimization controlling part for detecting the eye opening in the eye pattern of a data signal based on the discrimination information concerning the data signal from the clock and data recovery circuit and controlling the dispersion characteristics of the dispersion equalizer as appropriate according to the size of such eye opening so that the error count in the data signal will be minimized.

In another preferred construction, the waveform optimization controlling part further comprises eye opening detecting part for obtaining the size of the eye opening sufficient for three decision points on the time base of the eye pattern, i.e., the left decision point, the central decision point, and the right decision point, to be accommodated in the eye pattern by way of controlling the spacing between the adjacent decision points, and operation processing part for controlling the dispersed value of the dispersion equalizer to achieve the optimum value of the dispersed value by increasing or decreasing the dispersed value as appropriate according to the size of the eye opening thus obtained.

In another preferred construction, the operation processing part compares the current and previous sizes of the eye opening, and increases or decreases the dispersed value of the dispersion equalizer as appropriate according to the increase or decrease in the size of the eye opening.

In another preferred construction, the operation processing part compares the current and previous sizes of the eye opening, and increments the dispersed value of the dispersion equalizer by the first pre-determined value if the size of the eye opening has increased, and decrements the dispersed value of the dispersion equalizer by the second pre-determined value if the size of the eye opening has decreased.

In another preferred construction, the operation processing part compares the current and previous sizes of the eye opening, and according to the increase or decrease in the size of the eye opening, performs the first process of increasing or decreasing the dispersed value of the dispersion equalizer, and the second process of inversing the increasing or decreasing of the dispersed value of the dispersion equalizer.

In another preferred construction, the operation processing part compares the current and previous sizes of the eye opening, and increments the dispersed value of the dispersion equalizer if the size of the eye opening has increased, decrements the dispersed value of the dispersion equalizer if the size of the eye opening has decreased, and when the dispersed value is to be increased, decreases the incremental value of the dispersed value stepwise as appropriate according to the increase in the size of the eye opening.

In another preferred construction, the operation processing part compares the current and previous sizes of the eye opening, and every time the direction of increase or decrease in the size of the eye opening changes, performs by switching between the first process of incrementing the dispersed value of the dispersion equalizer by a pre-determined value and the second process of decrementing the dispersed value of the dispersion equalizer by a pre-determined value.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising decision threshold voltage control circuit for controlling the decision points to achieve the optimum value by performing selectively, according to the results of measuring error pulses, the processes of controlling the distance between the outer decision points, moving the three decision points while maintaining the spacing between the adjacent decision points, and changing the error pulse measuring times.

In another preferred construction, the clock and data recovery circuit being a clock and data recovery circuit with a decision threshold voltage application function, to which a circuit for converting an optical signal into an electric signal and outputting the resultant signal as an input data signal, and functions of extracting a clock frequency element from the input data signal amplified to a pre-determined amplitude, discriminating the input data signal between 1 and 0 at the timing of this clock, and applying a decision threshold voltage, are added, and comprising decision threshold voltage control circuit for controlling the decision points to achieve the optimum value by performing selectively, according to the results of measuring error pulses, the processes of controlling the distance between the outer decision points and changing the error pulse measuring times.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising decision threshold voltage control circuit for controlling the decision points to achieve the optimum value by performing selectively, according to the results of measuring error pulses, the processes of controlling the distance between the outer decision points and moving the three decision points while maintaining the spacing between the adjacent decision points.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising decision threshold voltage control circuit for controlling the decision points to achieve the optimum value by controlling the distance between the outer decision points as appropriate according to the results of measuring error pulses.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising error counting part for performing the counting process on error counts near the H level and error counts near the L level of an input data signal, and operation processing part for, according to the results of counting errors, changing the distance of the upper decision point near the H level from the central decision point or from the lower decision point near the L level, according to the results of counting errors, moving the upper and lower decision points and the central decision points simultaneously while maintaining the spacing between the adjacent decision points, and according to the results of counting errors, changing the measuring time for error counts, and decision threshold voltage control circuit for setting the central decision point at the optimum position, while detecting the inner edges of the eye opening of the input data signal.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising error counting part for performing the counting process on error counts near the H level and error counts near the L level of an input data signal, operation processing part for, according to the results of counting errors, changing the distance of the upper decision point near the H level from the central decision point or from the lower decision point near the L level, and according to the results of counting errors, changing the measuring time for error counts, and decision threshold voltage control circuit for setting the central decision point at the optimum position while detecting the inner edges of the eye opening of the input data signal.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising error counting part for performing the counting process on error counts near the H level and error counts near the L level of an input data signal, and operation processing part for, according to the results of counting errors, changing the distance of the upper decision point near the H level from the central decision point or from the lower decision point near the L level, and according to the results of counting errors, moving the upper and lower decision points and the central decision points simultaneously, while maintaining the spacing between the adjacent decision points, and decision threshold voltage control circuit for setting the central decision point at the optimum position, while detecting the inner edges of the eye opening of the input data signal.

In another preferred construction, the clock and data recovery circuit being a clock and data recovery circuit with a decision threshold voltage application function, to which a circuit for converting an optical signal into an electric signal and outputting the resultant signal as an input data signal, and a function of extracting a clock frequency element from the input data signal amplified to a pre-determined amplitude, discriminating the input data signal between 1 and 0 at the timing of this clock, and applying a decision threshold voltage, are added, and comprising error counting part for performing the counting process on error counts near the H level and error counts near the L level of an input data signal, and operation processing part for, according to the results of counting errors, changing the distance of the upper decision point near the H level from the central decision point or from the lower decision point near the L level, and decision threshold voltage control circuit for setting the central decision point at the optimum position, while detecting the inner edges of the eye opening of the input data signal.

According to another aspect of the invention, a waveform optimization method for an optical data signal from an optical receiving device for discriminating and recovering a data signal, which results from converting an optical signal input through a dispersion equalizer into an electrical signal and amplifying it to a pre-determined amplitude, by using a clock and data recovery circuit for discriminating a data signal at the decision point controlled to achieve the optimum position, comprising the steps of controlling the dispersion characteristics of the dispersion equalizer so that the error count in the data signal recovered by the clock and data recovery circuit is minimized, by controlling the eye pattern of the data signal that has been amplified to a pre-determined amplitude.

In the preferred construction, the waveform optimization method for optical data signal further comprises the steps of detecting the eye opening in the eye pattern of a data signal based on discrimination information concerning the data signal from the clock and data recovery circuit, and controlling the dispersion characteristics of the dispersion equalizer as appropriate according to the size of such eye opening so that the error count in the data signal will be minimized.

In another preferred construction, the waveform optimization method for optical data signal further comprises the steps of obtaining the size of the eye opening sufficient for three decision points on the time base of the eye pattern, i.e., the left decision point, the central decision point, and the right decision point, to be accommodated in the eye pattern by way of controlling the spacing between the adjacent decision points, and controlling the dispersed value of the dispersion equalizer to achieve the optimum value of the dispersed value by increasing or decreasing the dispersed value as appropriate according to the size of the eye opening thus obtained.

In another preferred construction, in the step of controlling the dispersed value, compares the current and previous sizes of the eye opening, and increases or decreases the dispersed value of the dispersion equalizer as appropriate according to the increase or decrease in the size of the eye opening.

In another preferred construction, in the step of controlling the dispersed value, compares the current and previous sizes of the eye opening, and increments the dispersed value of the dispersion equalizer by the first pre-determined value if the size of the eye opening has increased, and decrements the dispersed value of the dispersion equalizer by the second pre-determined value if the size of the eye opening has decreased.

In another preferred construction, in the step of controlling the dispersed value, compares the current and previous sizes of the eye opening, and according to the increase or decrease in the size of the eye opening, performs the first process of increasing or decreasing the dispersed value of the dispersion equalizer, and the second process of inversing the increasing or decreasing of the dispersed value of the dispersion equalizer.

In another preferred construction, in the step of controlling the dispersed value, compares the current and previous sizes of the eye opening, and increments the dispersed value of the dispersion equalizer if the size of the eye opening has increased, decrements the dispersed value of the dispersion equalizer if the size of the eye opening has decreased, and when the dispersed value is to be increased, decreases the incremental value of the dispersed value stepwise as appropriate according to the increase in the size of the eye opening.

In another preferred construction, in the step of controlling the dispersed value, compares the current and previous sizes of the eye opening, and every time the direction of increase or decrease in the size of the eye opening changes, performs by switching between the first process of incrementing the dispersed value of the dispersion equalizer by a pre-determined value and the second process of decrementing the dispersed value of the dispersion equalizer by a pre-determined value.

According to a further aspect of the invention, a waveform optimization program for an optical data signal operating in an optical receiving device for discriminating and recovering a data signal, which results from converting an optical signal input through a dispersion equalizer into electrical signal and amplifying it to a pre-determined amplitude, by using a clock and data recovery circuit for discriminating a data signal at the decision point controlled to achieve the optimum position, comprising the functions of controlling the dispersion characteristics of the dispersion equalizer so that the error count in the data signal recovered by the clock and data recovery circuit is minimized, by controlling the eye pattern of the data signal that has been amplified to a pre-determined amplitude.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 37 is a diagram showing error-rate improving effects.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

Figure 1:
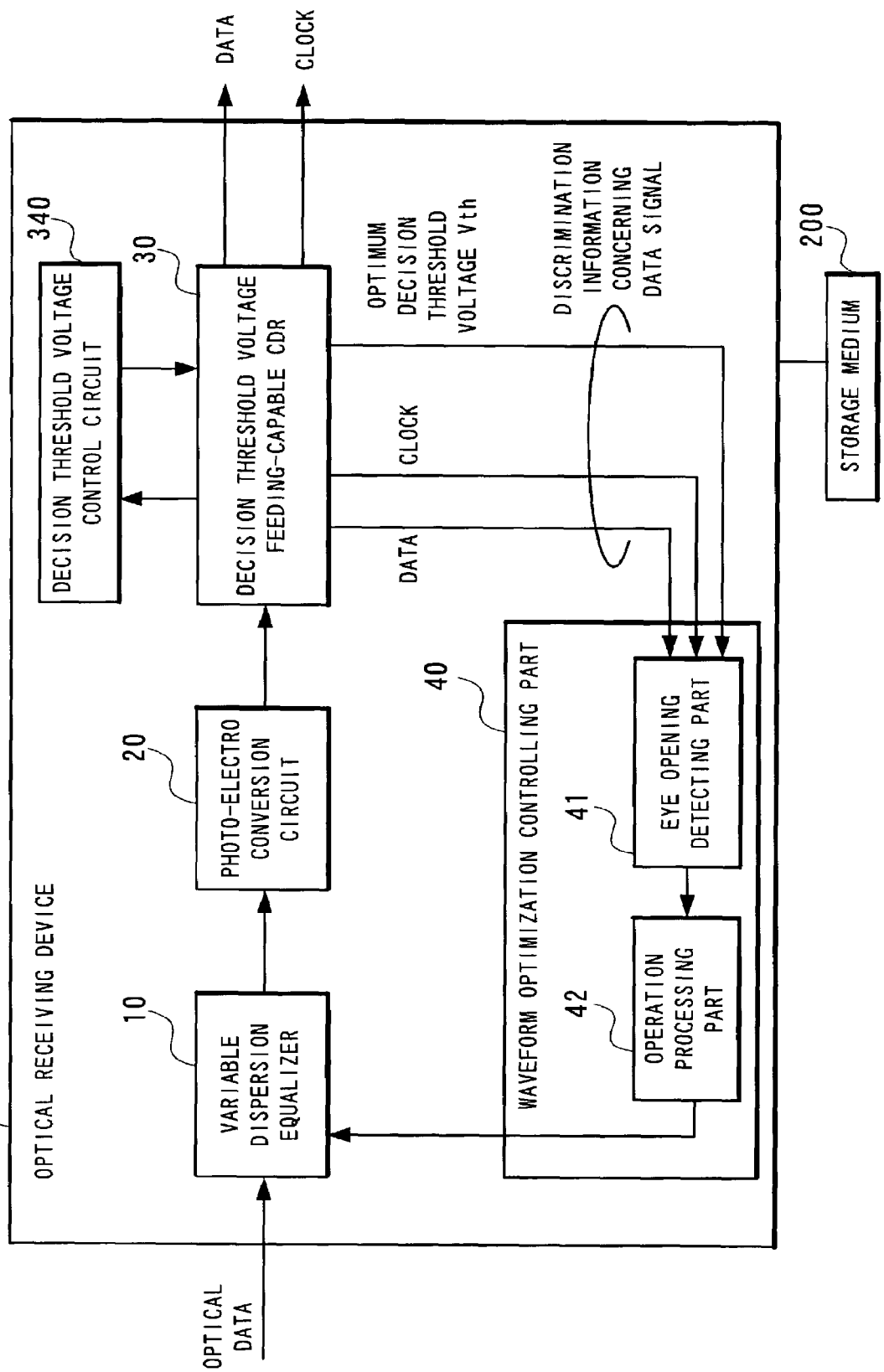
FIG. 1 is a block diagram showing the configuration of an optical receiving device according to the first embodiment of the present invention.

While the present invention can be applied to both optical receiving devices and repeating installations, this section will specifically describe the first embodiment featuring its application to an optical receiving device. FIG. 1 is a block diagram showing the configuration of an optical receiving device according to the first embodiment of the present invention.

According to this embodiment, an optical receiving device 1 comprises a variable dispersion equalizer 10, a photo-electro conversion circuit 20, a decision threshold voltage feeding-capable CDR 30, and a waveform optimization controlling part 40. The waveform optimization controlling part 40 includes an eye opening detecting part 41 and an operation processing part 42.

Figure 8:
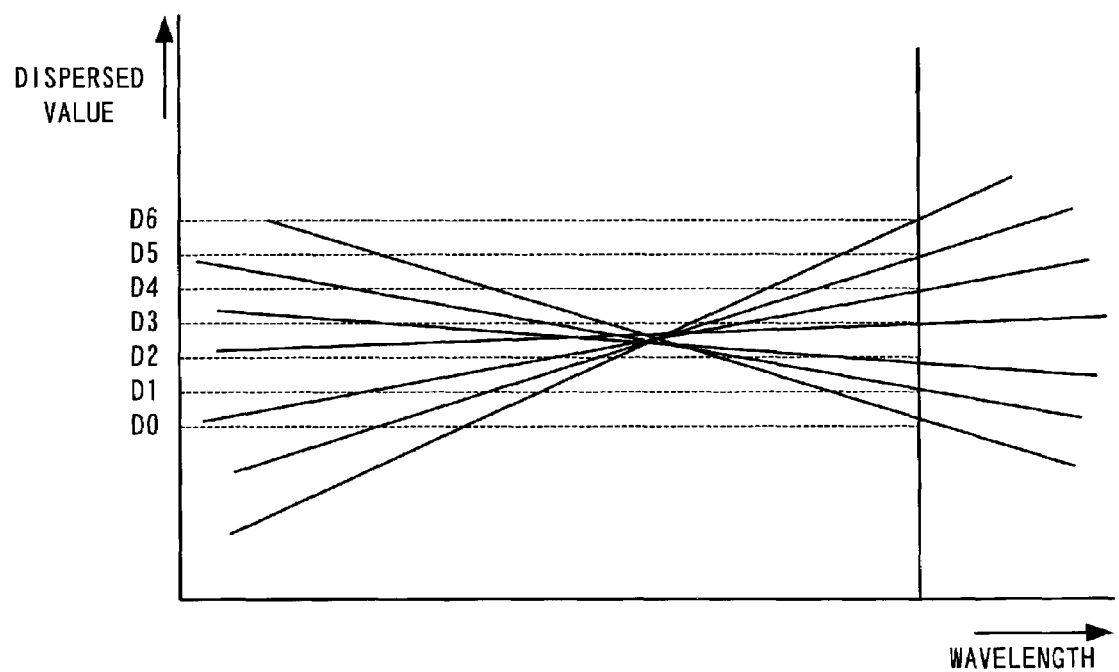
FIG. 8 is a schematic diagram illustrating the wavelength dispersion characteristics of the variable dispersion equalizer.

As shown in FIG. 8, the variable dispersion equalizer 10 is characterized by its ability to change the inclination of wavelength dispersion characteristics by controlling the temperature of the dispersion equalizer through use of a Peltier device or the like.

The photo-electro conversion circuit 20 converts an optical signal into an electric signal and amplifies it to a pre-determined amplitude.

The decision threshold voltage feeding-capable CDR 30 discriminates data signals sent from the photo-electro conversion circuit 20 at a decision point, which is always controlled to achieve an optimum position.

Based on the discrimination information of data signals output from the decision threshold voltage feeding-capable CDR 30, the waveform optimization controlling part 40 performs time-based sweeps on data signals, each sweep being synchronized with each data signal. It then detects the eye opening in an eye pattern, which is obtained by overlaying the data signals on a time base, and controls the variable dispersion equalizer 10 in such a manner that the best eye pattern for the optical data signal can be obtained.

Figure 3:
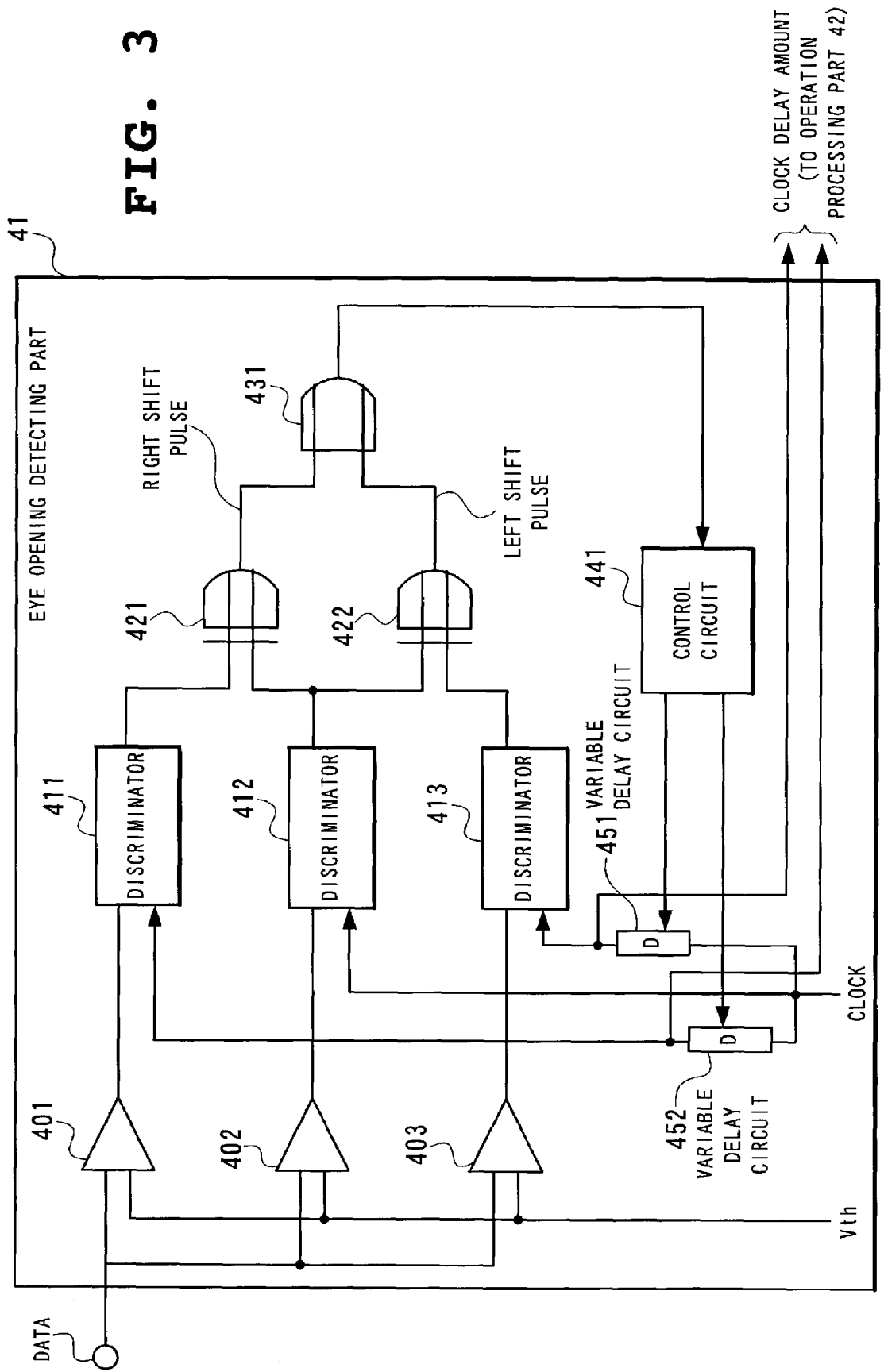
FIG. 3 is a block diagram showing an example configuration of the eye opening detecting part of the optical receiving device according to the first embodiment.

The eye opening detecting part 41 of the waveform optimization controlling part 40 detects the opening in an eye pattern, and outputs the information representing the size of the eye opening. Shown in FIG. 3 is one example of configuration of this eye opening detecting part 41, which consists of three comparators 401, 402, 403, three discriminators 411, 412, 413, two exclusive-OR circuits 421, 422, one OR circuit 431, a control circuit 441 for controlling the delay time of the discriminator 411 and the discriminator 413, and two delay circuits 451, 452 for providing the discriminator 411 and the discriminator 413 with a delay time relative to clock (clock delay amount).

The operation processing part 42 of the waveform optimization controlling part 40 adjusts the dispersion characteristics of the variable dispersion equalizer 10, based on the information representing the size of the opening of the eye pattern.

The operation of the optical receiving device 1 according to the first embodiment, in the configuration as described above, will now be described with reference to FIG. 1 through FIG. 8.

In FIG. 1, an optical data signal is converted to an electric signal and amplified to a pre-determined amplitude by the photo-electro conversion circuit 20. The signal is then discriminated and recovered by the decision threshold voltage feeding-capable CDR 30 at the decision point, which is always controlled to achieve the optimum position.

Figure 2:
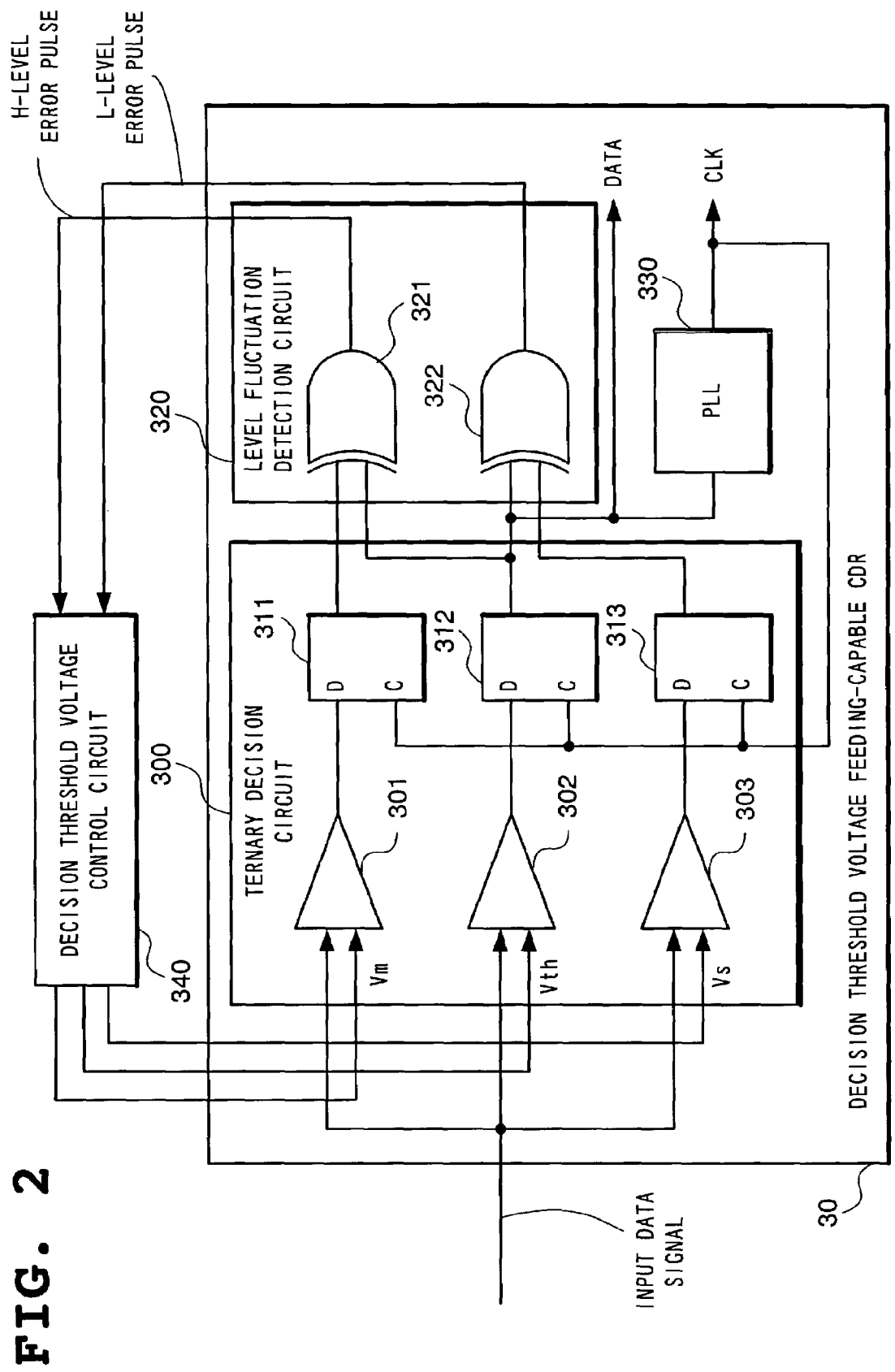
FIG. 2 is a block diagram showing the configuration of a decision threshold voltage feeding-capable CDR used in the optical receiving device according to the first embodiment of the present invention.

FIG. 2 shows an example configuration of the decision threshold voltage feeding-capable CDR 30, which comprises a ternary decision circuit 300 for discriminating among the upper decision point near the H level of the input data signal, the central decision point near the central level, and the lower decision point near the L level; a level fluctuation detection circuit 320 for detecting level fluctuations and outputting the results to the decision threshold voltage control circuit 340; and a PLL circuit 330.

In this configuration, the ternary decision circuit 300 further comprises comparators 301, 302, 303 and discriminators 311, 312, 313, each consisting of a flip-flop, and the level fluctuation detection circuit 320 further comprises exclusive-OR circuits 321, 322.

This decision threshold voltage feeding-capable CDR 30 has the upper, central, and lower decision points placed at positions near the H, central, and L levels of the data, respectively, to detect a match or mismatch in the discrimination results between the discriminator 311 (at the upper decision point) and the discriminator 312 (at the central decision point), and between the discriminator 312 (at the central decision point) and the discriminator 313 (at the lower decision point). If it finds a mismatch between the discriminator 311 (at the upper decision point) and the discriminator 312 (at the central decision point), the CDR outputs an H level error pulse; if it finds a mismatch between the discriminator 312 (at the central decision point) and the discriminator 313 (at the lower decision point), it outputs an L level error pulse.

The control circuit 340 controls so that a decision threshold voltage Vth will be applied to minimize the H level error pulse and the L level error pulse (i.e., the optimum decision threshold voltage).

The eye opening detecting part 41 is configured as shown in the example configuration of FIG. 3.

On the time base of the eye pattern, the left decision point TL is placed near the left cross point, the central decision point Tth in the center, and the right decision point TR near the right cross point (refer to FIG. 4), each of which performs the discriminating process using the discriminator 411, the discriminator 412, and the discriminator 413, respectively. The central decision point Tth is given by the decision threshold voltage feeding-capable CDR 30 the same phase as the optimum decision threshold voltage Vth.

Figure 4:
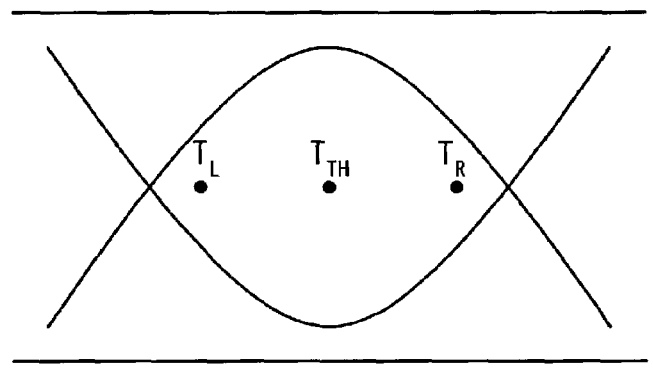
FIG. 4 is a schematic diagram showing the states of the eye pattern and the three decision points.

In this configuration, if all the decision points are within the eye pattern, as shown in FIG. 4, the discrimination results will match between the left decision point TL and the central decision point Tth and between the central decision point Tth and the right decision point TL TR.

Figure 5:
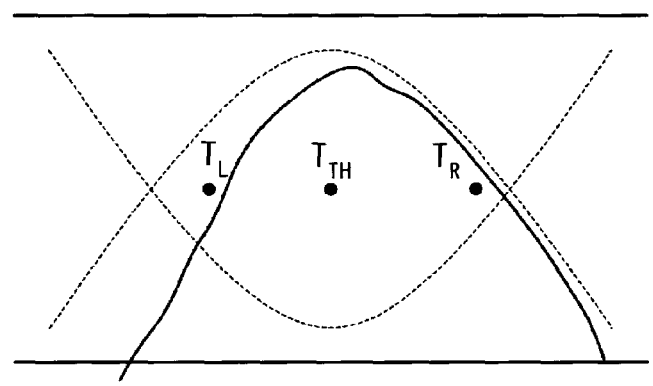
FIG. 5 is a schematic diagram showing the states of the eye pattern and the three decision points.

If, however, the eye pattern waveform is distorted as a result of a waveform deterioration or other reasons and one of the decision points is outside the eye pattern (in FIG. 4, this applies to the left decision point TL), then the discrimination results do not match between the left decision point TL and the central decision point Tth, as shown in FIG. 5.

Figure 7:
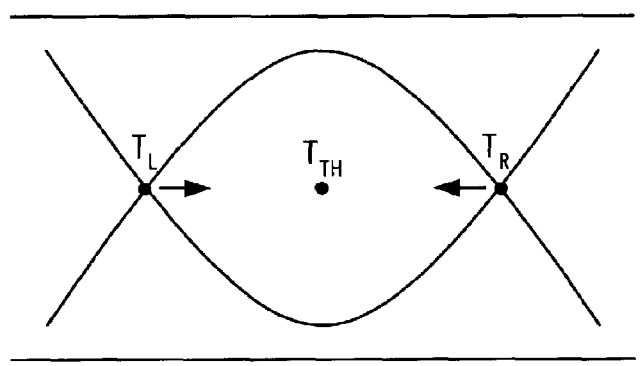
FIG. 7 is a schematic diagram showing the states of the eye pattern and the three decision points.

If either of the left decision point TL or the right decision point TR should be outside the eye pattern, mismatch results and an error pulse is sent to the control circuit 441. When this takes place, the control circuit 441 reduces the spacing between the adjacent decision points until there are no error pulses, by controlling the clock delay amount between the discriminator 411 and the discriminator 413 as shown in FIG. 7.

Figure 6:
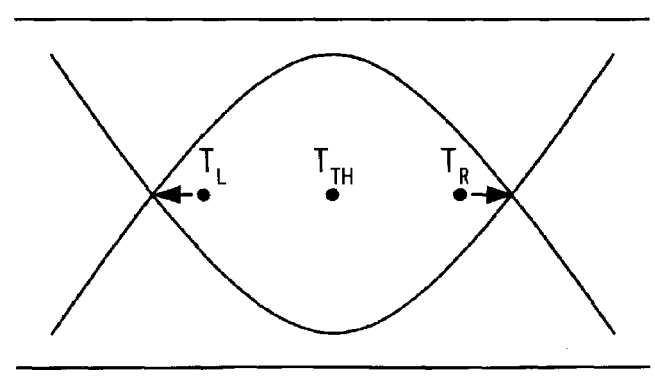
FIG. 6 is a schematic diagram showing the states of the eye pattern and the three decision points.

If errors to be detected are exhausted, the control circuit 441 increases the spacing between the adjacent decision points, as shown in FIG. 6, by controlling the clock delay amount between the discriminator 411 and the discriminator 413.

This ensures that the left decision point TL and the right decision point TR always stay near the respective cross points of the eye pattern (i.e., the edges of the eye pattern), thereby allowing the size of the eye opening of the eye pattern to be detected by measuring the time difference between the left decision point TL and the right decision point TR or by obtaining the difference in clock delay amount between the variable delay circuit 451 and the variable delay circuit 452.

As shown in FIG. 3, the eye opening detection circuit 41 outputs the clock delay amounts of the variable delay circuit 451 and the variable delay circuit 452 to the operation processing part 42. The operation processing part 42 in turn measures the size of the eye opening by obtaining successively the difference of the clock delay amount between the variable delay circuit 451 and the variable delay circuit 452.

The eye opening detection circuit 41 of the waveform optimization controlling part 40 detects the eye opening, using the optimum decision threshold voltage Vth and the clock as the discrimination information concerning the data signal, and the data signal, both obtained from the decision threshold voltage feeding-capable CDR 30.

FIG. 8 shows an example of characteristics of the variable dispersion equalizer 10. The dispersion equalizer 10 can perform waveform shaping by changing inclination of the characteristic curve to change the dispersed value through temperature control by means of a Peltier device or the like, and consequently, the size of the eye opening of an eye pattern.

The control algorithm for the operation processing part 42 will now be described with reference to FIGS. 9, 10, 11, and 12.

Figure 9:
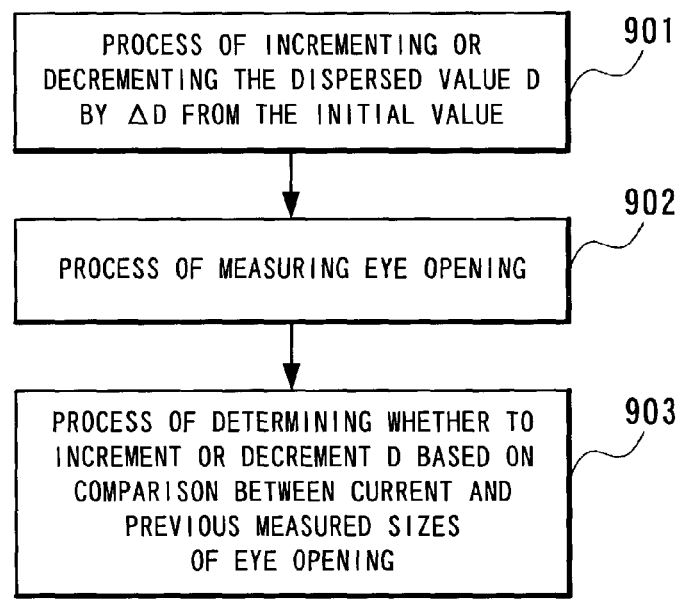
FIG. 9 is a diagram illustrating the basic idea of the control algorithm of the present invention.

FIG. 9 is a diagram illustrating the basic idea of the control algorithm for the operation processing part 42.

The processing steps undertaken by the operation processing part 42 consist of incrementing or decrementing the dispersed value D by ΔD from the initial value (Step 901), measuring the size of the eye opening (Step 902), and determining whether to increment or decrement the dispersed value D by comparing the size of the eye opening from the current measurement with that from the previous measurement (Step 903).

As described above, the size of the eye opening is measured as a difference between the clock delay amount of the variable delay circuit 451 and that of the variable delay circuit 452, which have been output from the eye opening detection circuit 41.

A specific example of Step 901, which determines whether to increment or decrement the dispersed value D by comparing the size of the eye opening from the current measurement with that from the previous measurement, will now be described with reference to FIG. 10. The steps in FIG. 10 corresponding to Steps 901 through 903 in FIG. 9 are identified as Steps 901A through 903A, respectively.

Figure 10:
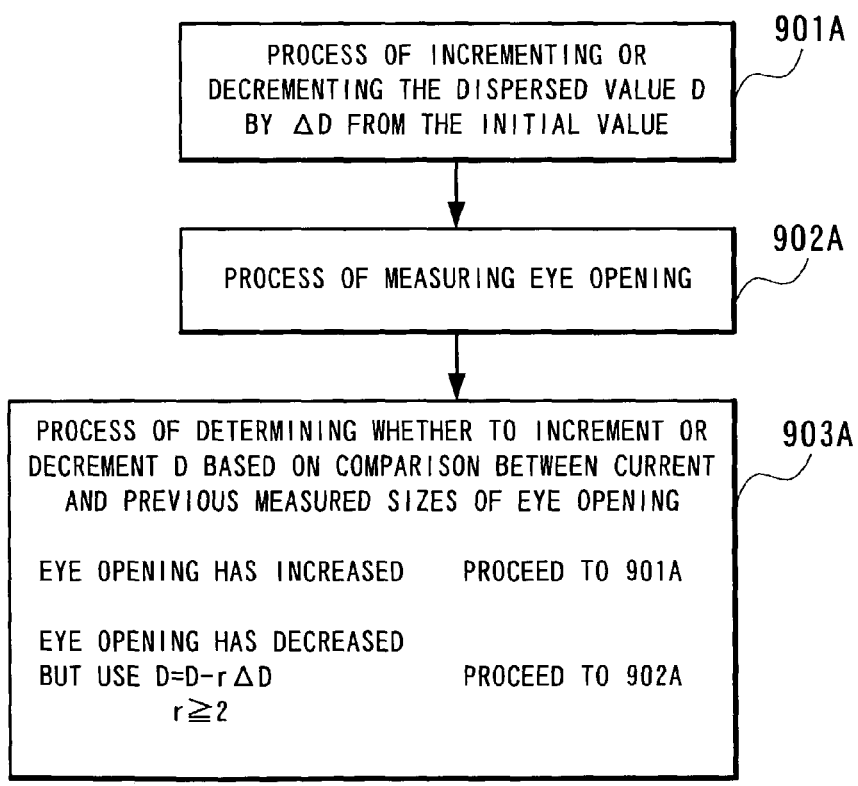
FIG. 10 is a diagram illustrating the control algorithm for the operation processing part of the first embodiment.

In Step 903A in FIG. 10, the algorithm compares the current measurement with the previous measurement of the eye opening; if it finds that the size of the eye opening has increased (improved) from the previous measurement, it returns to Step 901A to increment the dispersed value D by ΔD and proceeds to repeat the same operation.

The amount of increment ΔD in the disperse value D is set as appropriate, based on the wavelength of optical signals transmitted/received by the optical receiving device.

If, on the other hand, the comparison reveals that current size of the eye opening has decreased (aggravated) from the previous measurement obtained in Step 901A, the algorithm decrements the dispersed value D by nΔD(n≦2) and returns to Step 902A to repeat the same operation.

This algorithm is characterized by the fact that, if the size of the eye opening has aggravated, it decrements the eye opening by (nΔD(n≦2)), i.e., a greater amount than the incremental amount per step for the disperse value D, (ΔD), and goes back to the previous steps.

This provides the effect that it suffices for Step 901 to simply make a monotone increase by ΔD in the eye opening.

While this embodiment has been described by taking as an example a case where the dispersed value D is increased from the minimum value, it is also possible to control the size of the eye opening in the opposite direction, that is, to decrease the dispersed value D from a larger value. If the latter direction is used, the algorithm will operate as follows. It decreases the size of the eye opening by ΔD for every increase (improvement), and whenever the size of the eye opening has decreased (aggravated), it increases the dispersed value by nΔD(n≦2). Furthermore, the same results will be obtained regardless of which dispersed value D the algorithm uses to start the operation with.

Figure 11:
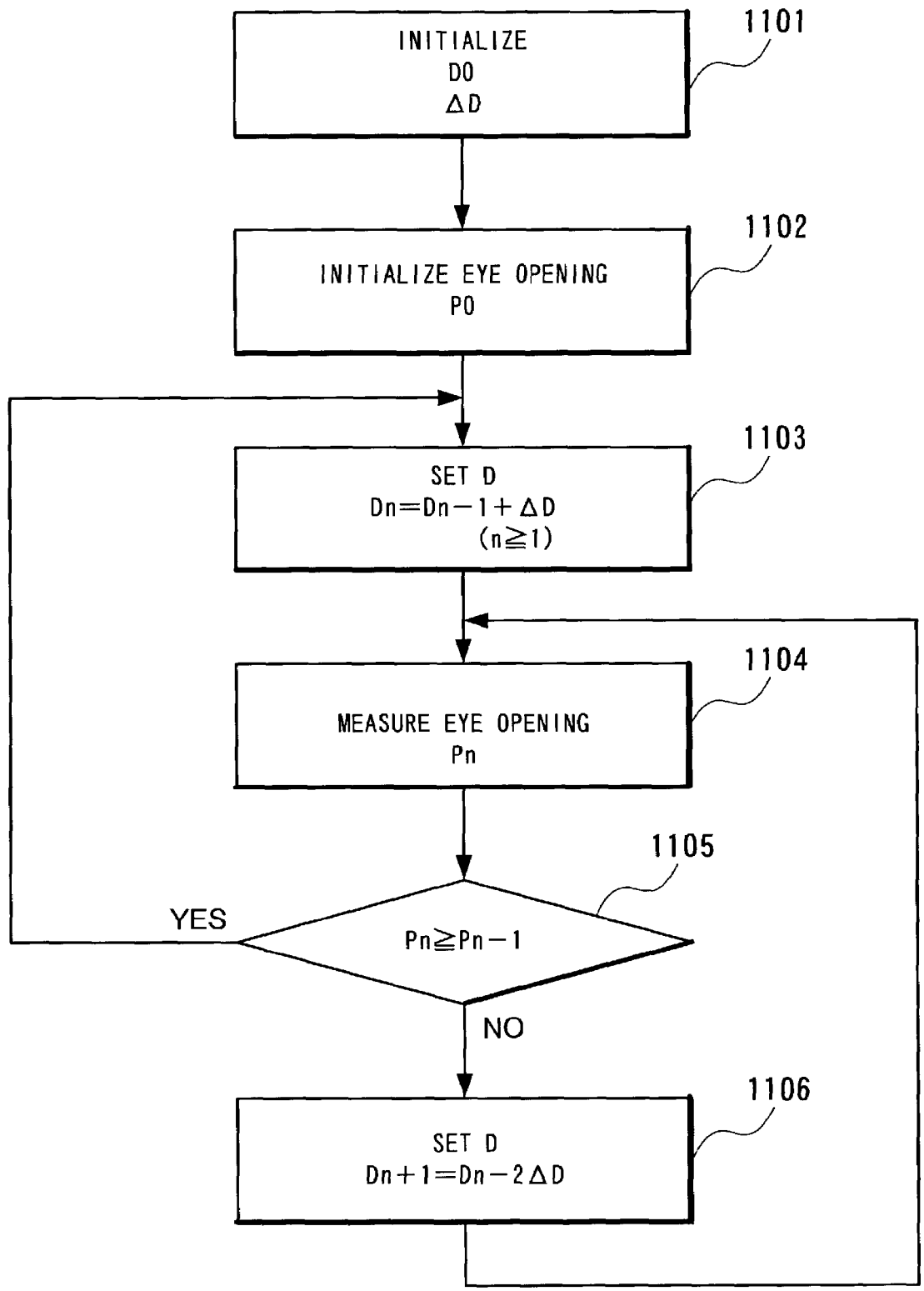
FIG. 11 is a flow chart illustrating the operation of the operation processing part of the optical receiving device according to the first embodiment.

FIG. 11 shows a flow chart that realizes the algorithm of this embodiment shown in FIG. 9.

In initializing, the algorithm determines the initial value D0 of the dispersed value D and the incremental amount ΔD per step (Step 1101). It then measures the initial value P0 for the size of the eye opening at the disperse value D0 (dispersed value D0 in FIG. 12) (Step 1102).

Figure 12:
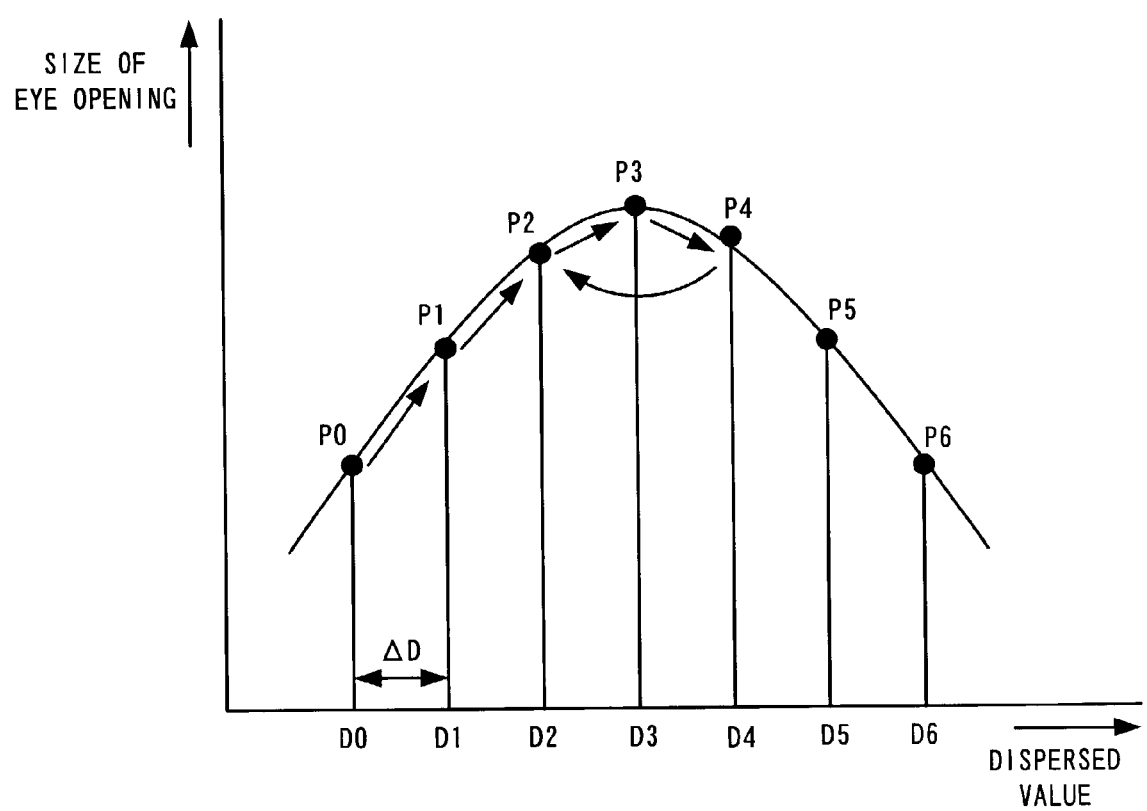
FIG. 12 is a diagram illustrating the relationship between the eye opening and the dispersed value in the first embodiment.

It then increments the dispersed value D by ΔD (Step 1103), and measures the size of the eye opening P1 at the dispersed value D1 in FIG. 12 (Step 1104).

It compares the sizes of the eye opening P0 and P1 (Step 1105), and finding that the size of the eye opening P1 is larger, goes back to Step 1103 to measure the size of the eye opening P2, using the dispersed value D2=D1+ΔD.

It further compares the eye openings P1 and P2 at Step 1105, and finding that the size of the eye opening P2 is larger, it goes back to Step 1103 to measure the size of the eye opening P3, using the dispersed value D3=D2+ΔD.

By repeating these steps, the algorithm brings the dispersed value D nearer to the optimum position. At the dispersed value D4, however, the algorithm finds that the size of the eye opening P4 has decreased from the size of the eye opening P3, getting away from the optimum position ("No" results at Step 1105). At this time, the algorithm measures the size of the eye opening, using the dispersed value D=D4−2ΔD (i.e., it goes back to the dispersed value D2) Step 1106).

In other words, by setting repeatedly the dispersed value in the order, D0-->D1-->D2-->D3 (optimum position)-->D4-->D2-->D3 (optimum position)-->D4-->D2 and so on, the algorithm controls the dispersed value D to make it remain near the optimum position.

You can of course choose to perform control by setting the initial value of the dispersed value D is set at D6, a larger value, and decrementing the dispersed value by ΔD as the size of the eye opening increases (improves) and increments it by 2ΔD as the size of the eye opening decreases (aggravates). The same results will be obtained whichever dispersed value D you may choose to start the operation with.

By controlling as described above, it becomes possible to discriminate optical signals in an optimum condition even when a waveform distortion occurs somewhere along the transmission line, because the size of the eye opening is always maintained to be the largest.

Second Embodiment

The second embodiment of the present invention will now be described with reference to FIGS. 13, 14, and 15.

Figure 13:
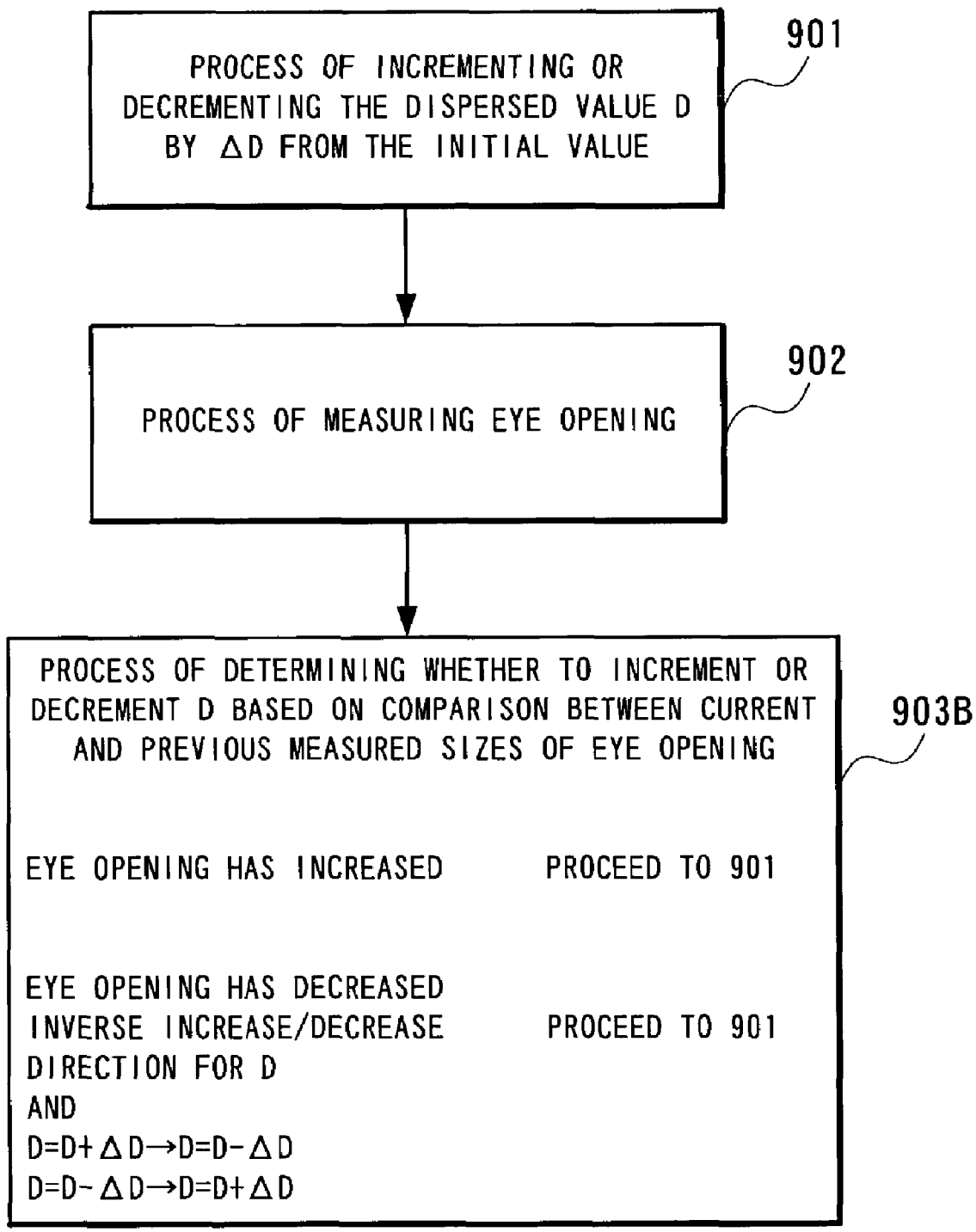
FIG. 13 is a diagram illustrating the control algorithm for an operation processing part of the second embodiment.

FIG. 13 is a diagram illustrating the control algorithm for the operation processing part 42 according to the second embodiment. FIG. 14 shows a flow chart realizing such control algorithm operation. FIG. 15 is a diagram showing the relationship between the dispersed value D and the size of the eye opening P.

The second embodiment adopts another idea of Step 903 in FIG. 9, which determines whether to increment or decrement the dispersed value D by comparing between the current and previous measurements of the size of the eye opening.

As with the first embodiment, this embodiment begins with the minimum value D0 of the dispersed value D and increments it by ΔD with every increase (improvement) in the size of the eye opening.

This embodiment differs from the first embodiment in that, as seen from Step 903B for the control algorithm in FIG. 13, the algorithm switches the operational direction from increase to decrease if the size of the eye opening has decreased (aggravated). It then controls the dispersion characteristic to make it decrease by ΔD until the size of the eye opening decreases.

This operation of the algorithm will now be described in greater detail with reference to the FIG. 14 flow chart and FIG. 15.

Similarly to the first embodiment described above, the algorithm starts its operation with the minimum value D0 of the dispersed value D.

In initializing, the algorithm determines the initial value D0 of the dispersed value D and the incremental amount ΔD per step (Step 1401). Next, it measures the initial value P0 for the size of the eye opening at the disperse value D0 (dispersed value D0 in FIG. 15) (Step 1402). It then increments the dispersed value D by ΔD (dispersed value D1 in FIG. 15) (Step 1403), and measures the size of the eye opening P1 (Step 1404).

It compares the sizes of the eye opening P0 and P1 (Step 1405), and finding that the size of the eye opening P1 is larger, goes back to Step 1403 to measure the size of the eye opening P2, using D2=D1+ΔD as the dispersed value. It further compares between the sizes of eye opening P1 and P2 at Step 1405, and finding that the size of the eye opening P2 is larger, it goes back to Step 1403 to measure the size of the eye opening P3 at Step 1405, using D3=D2+ΔD as the dispersed value.

After repeating these steps, the algorithm finds at the dispersed value D4 that the size of the eye opening P4 is smaller than P3 ("No" results at Step 1405). Following this step, the algorithm proceeds to Step 1406 in FIG. 14. In this step, it decreases the dispersed value D in the order D4→D3→D2 . . . and so on, and performs the measuring process for the eye opening (Step 1407) and the comparing process for the sizes of the eye opening (Step 1408).

At this point, the size of the eye opening P2 at the dispersed value D2 has decreased from P3 ("No" results at Step 1408), so the algorithm goes back to Step 1403 to increase the dispersed value D in the order D2→D3→D4 . . . and so on.

As a result of performing the above-described processes, the dispersed value D is controlled to stay near D3, which is the optimum dispersed value.

While the second embodiment starts the control with the minimum value of the dispersed value D, it goes without saying that you can choose to perform the control in the opposite direction, beginning with a larger value, for example D6, of the dispersed value D. The same results will be obtained whichever dispersed valued D you may start the operation with.

Third Embodiment

The third embodiment of the present invention will now be described with reference to FIGS. 16, 17, and 18.

Figure 16:
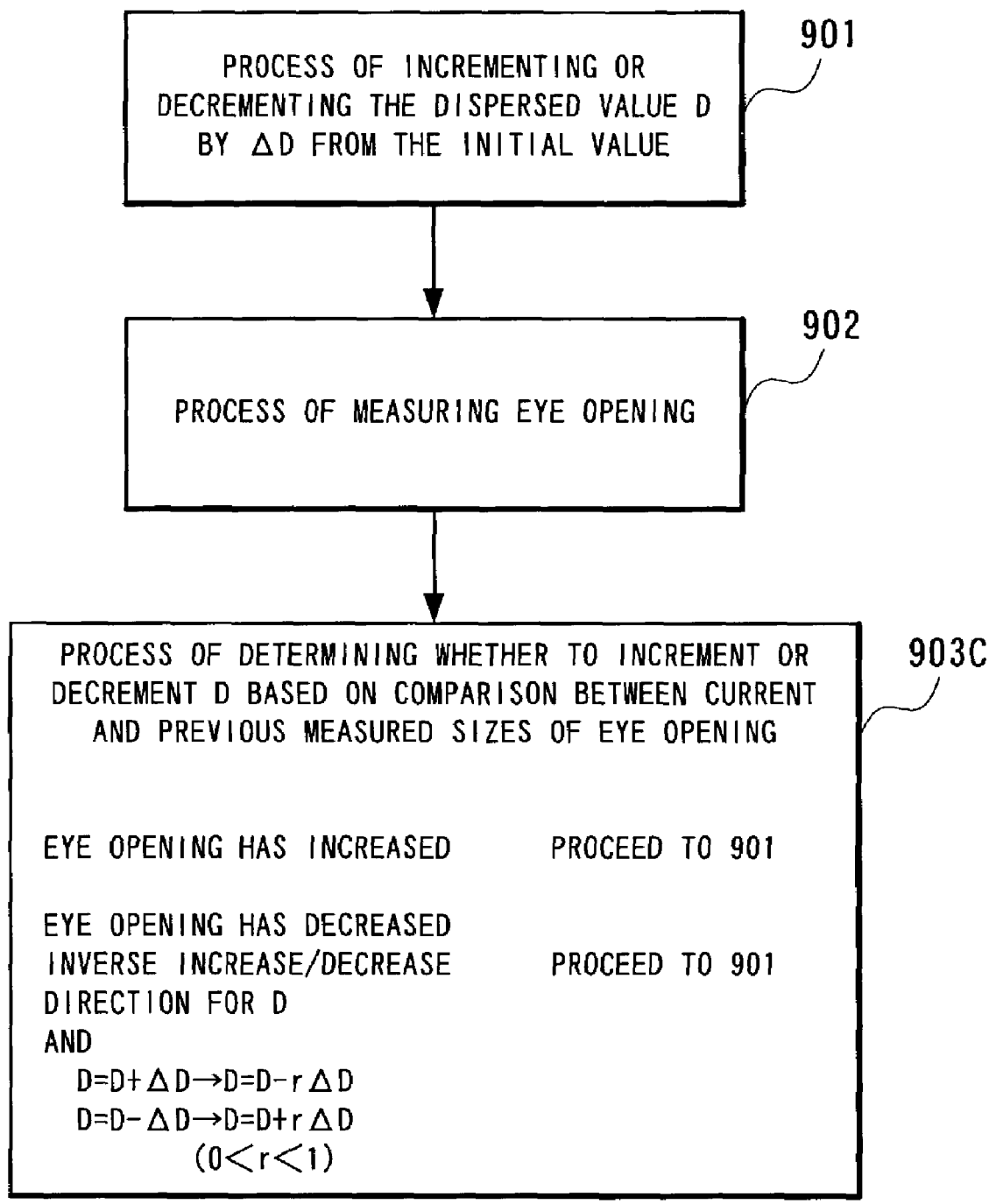
FIG. 16 is a diagram illustrating the control algorithm for an operation processing part of the third embodiment.

FIG. 16 is a diagram illustrating the control algorithm for the operation processing part 42 according to the third embodiment. FIG. 17 is a flow chart realizing such control algorithm operation. FIG. 18 is a diagram showing the relationship between the dispersed value D and the size of the eye opening P.

The third embodiment adopts yet another idea for Step 903 in FIG. 9, which determines whether to increment or decrement the dispersed value D by comparing between the current and previous measurements of the size of the eye opening.

This embodiment is similar to the second embodiment in that the algorithm begins with the minimum value D0 of the dispersed value D and increments it by ΔD with every increase (improvement) in the size of the eye opening and that the algorithm switches the operational direction from increase to decrease if the size of the eye opening has decreased (aggravated).

Figure 14:
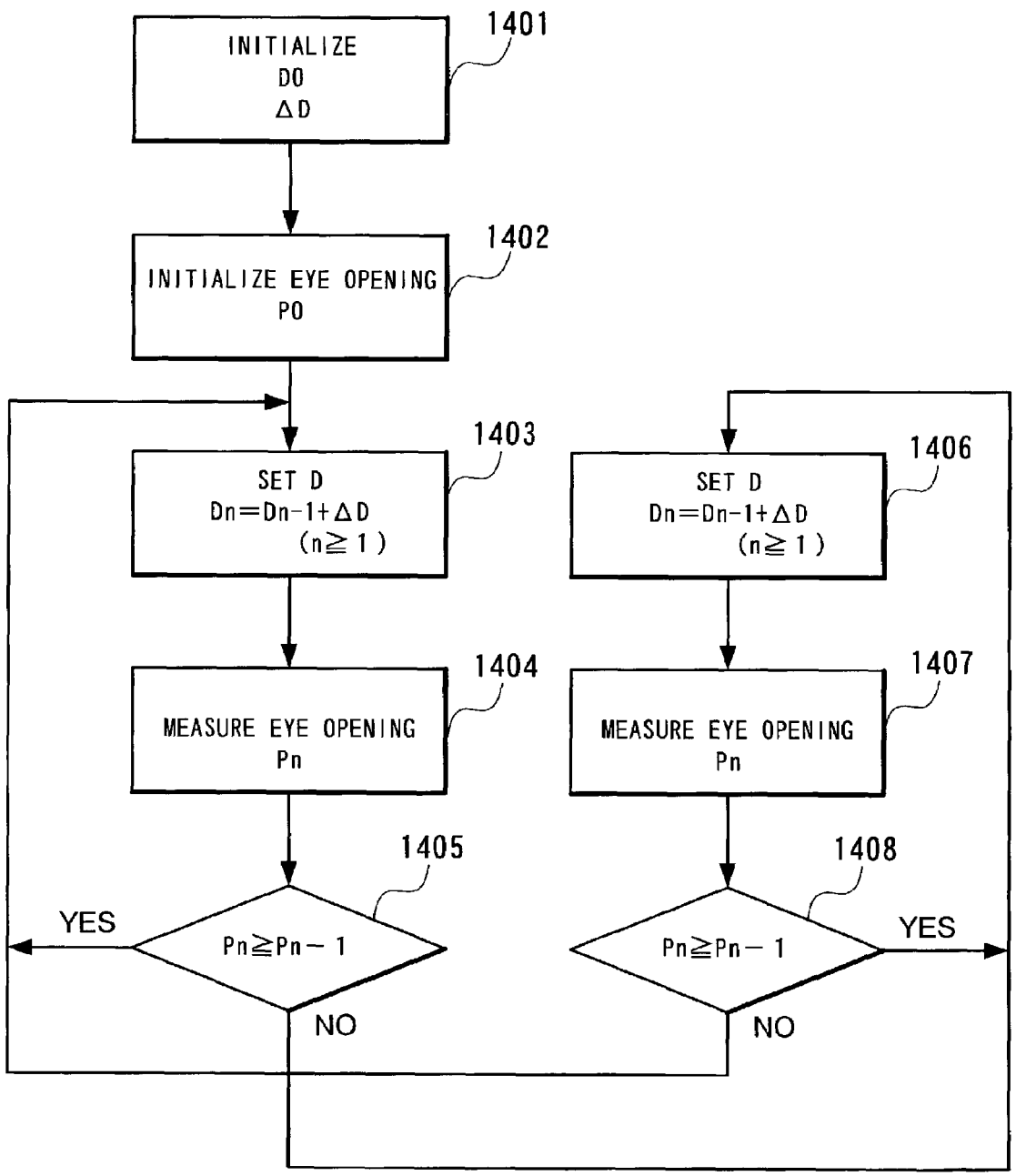
FIG. 14 is a flow chart illustrating the operation of the operation processing part of the optical receiving device according to the second embodiment.
Figure 15:
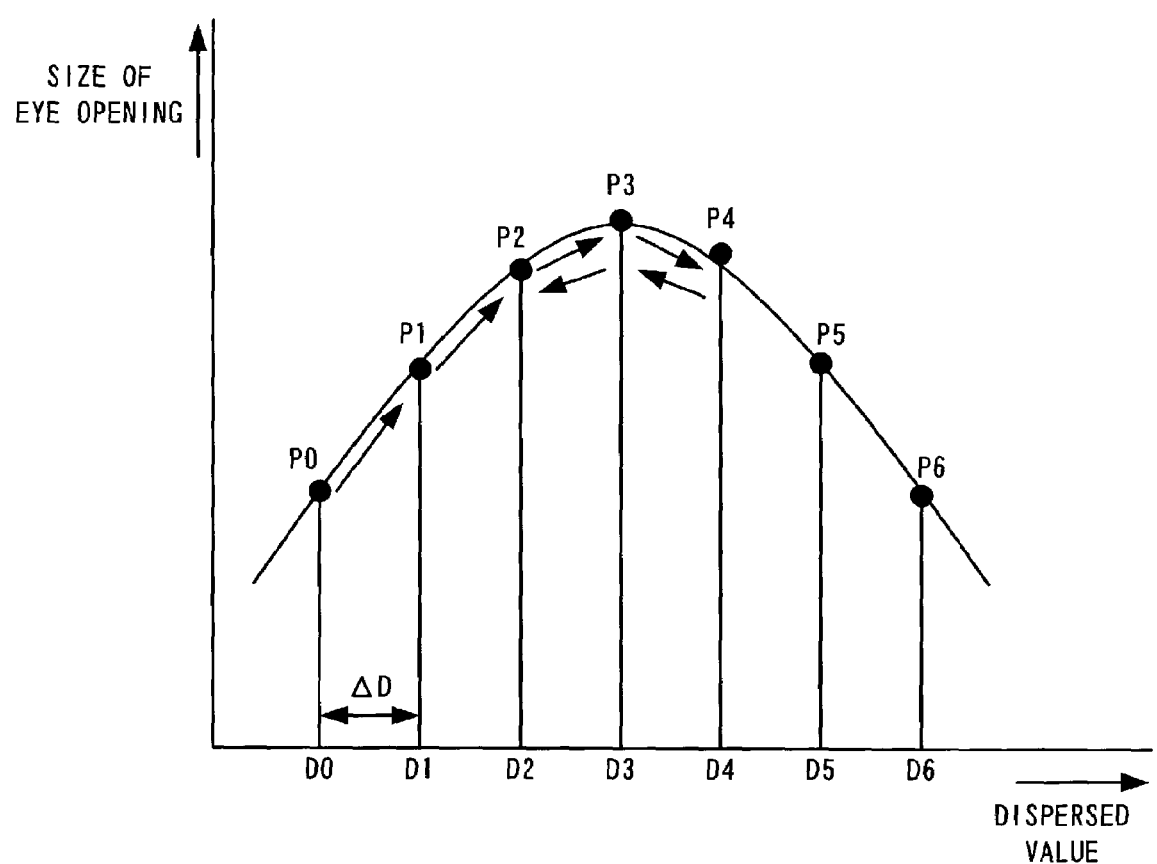
FIG. 15 is a diagram illustrating the relationship between the eye opening and the dispersed value in the second embodiment.
Figure 17:
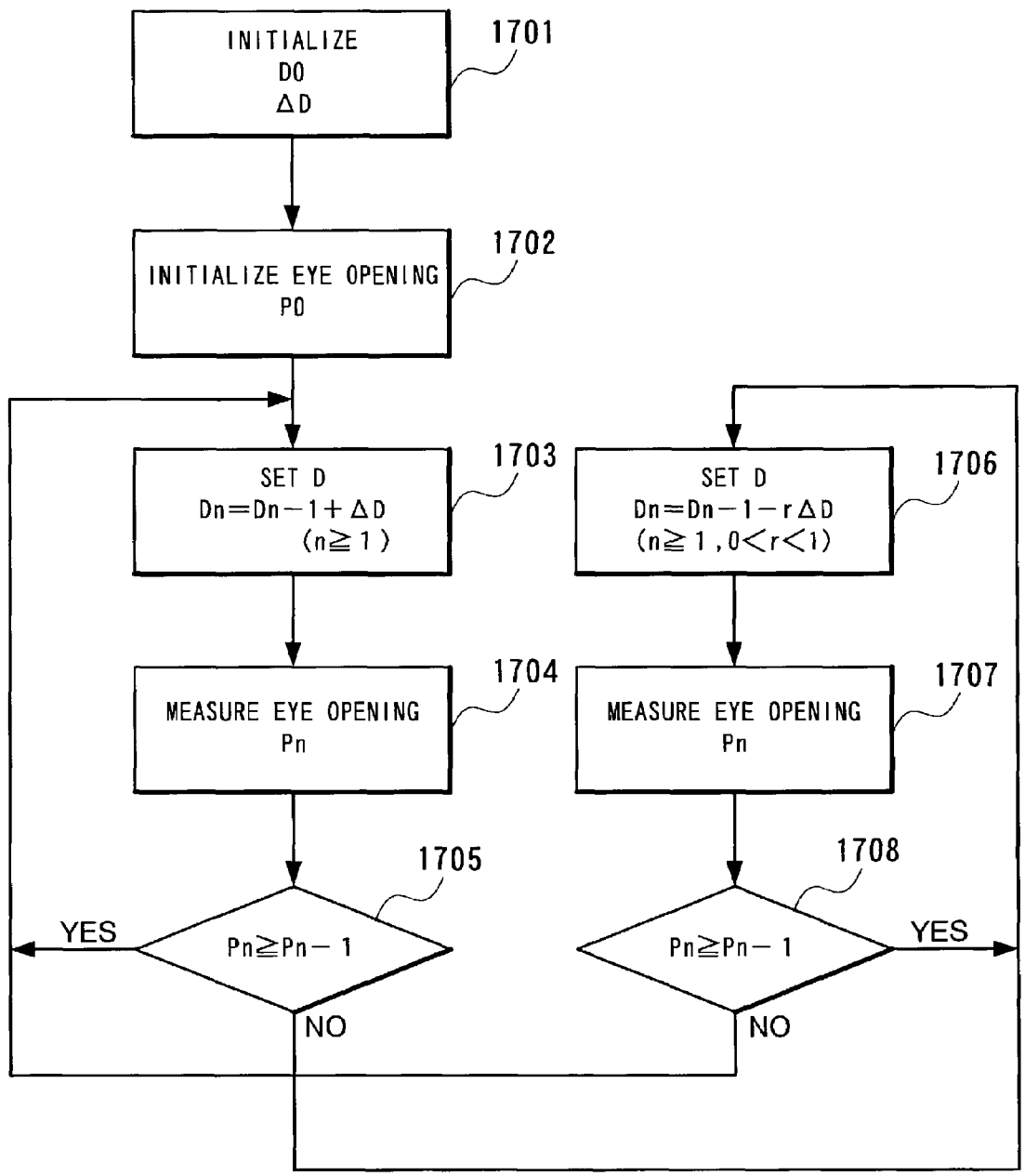
FIG. 17 is a flow chart illustrating the operation of the operation processing part of the optical receiving device according to the third embodiment.
Figure 18:
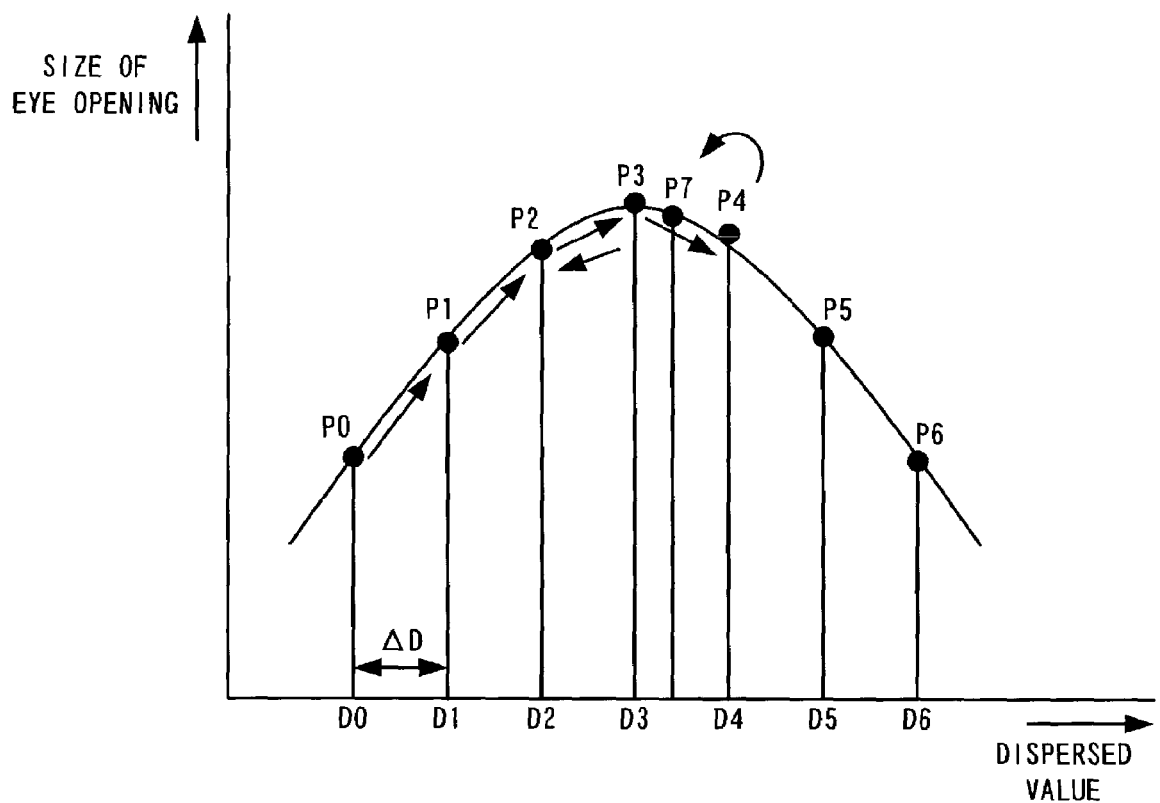
FIG. 18 is a diagram illustrating the relationship between the eye opening and the dispersed value in the third embodiment.

Except for Step 1706, the processing steps for this embodiment shown in the flow chart of FIG. 17 are identical to the corresponding steps for the second embodiment shown in the flow chart of FIG. 14. The only step differing from the second embodiment, Step 1706, will now be described.

Unlike the second embodiment, this third embodiment is characterized by the use of a decremental amount per step of rΔD(0<r<1) in Step 1706. By setting the dispersed value in smaller decrements, a greater accuracy can be expected in controlling the dispersed value D to make it stay near the optimum dispersed value.

The control achieved by the waveform optimization controlling part 40 in the first through third embodiments can be realized by loading the waveform optimizing program, which is a computer program including the various functions of the controlling part, in the memory of a computer-based processor, in addition to being implemented as hardware incorporating these function. As shown in FIG. 1, this waveform optimization program is stored in a magnetic disc, a semi-conductor memory, or other storage medium 200. By being loaded from the storage medium to a computer-based processor, the program controls the operation of the computer-based processor to realize the above-mentioned various functions of the waveform optimization controlling part 40.

Fourth Embodiment

This embodiment achieves the optimum control of decision threshold positions at different light receiving level by adopting digital operation processing in the decision threshold voltage control circuit 340 of a decision threshold voltage feeding-capable CDR 30 shown in FIG. 1.

Figure 19:
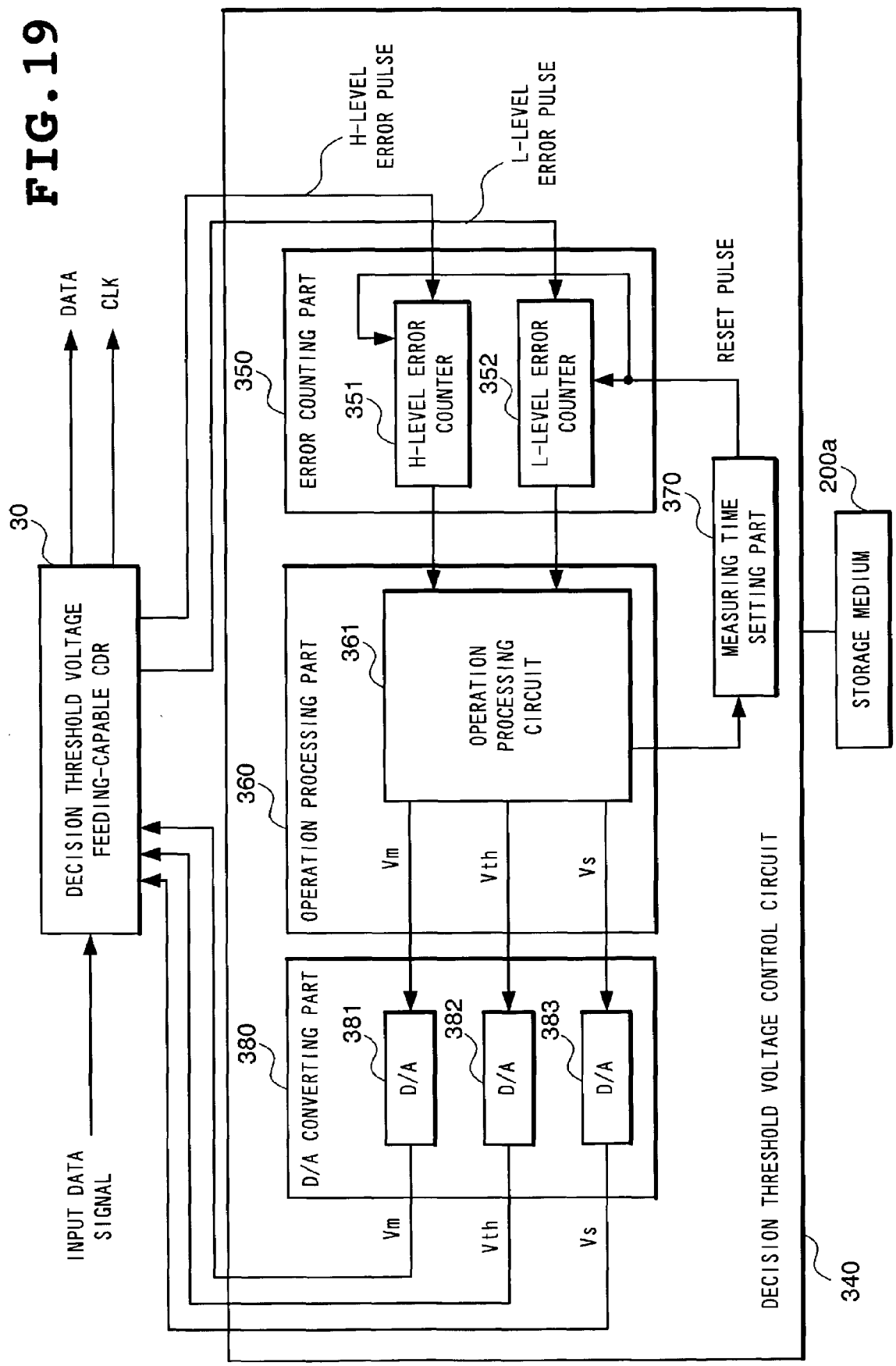
FIG. 19 is a block diagram showing the configuration of a decision threshold voltage control circuit of a decision threshold voltage feeding-capable CDR according to the fourth embodiment of the present invention.

FIG. 19 is a block diagram showing the configuration of a decision threshold voltage control circuit of a decision threshold voltage feeding-capable CDR according to the first (fifth?) embodiment of the present invention.

The decision threshold voltage feeding-capable CDR 30 features the addition of a function for applying a decision threshold voltage to the CDR (clock and data recovery). This function extracts a clock frequency element from the data signal, which has been obtained by converting an optical element into an electric signal and amplifying the resulting signal to a pre-determined amplitude. At the timing of this clock, the function discriminates the input data signal between 1 and 0. In the decision threshold voltage feeding-capable CDR 30, the decision threshold voltage control circuit 340 uses the control algorithm to provide the optimum decision threshold voltage with CDR.

Such a decision threshold voltage feeding-capable CDR 30 has previously been proposed. An example configuration of such a circuit is as shown in FIG. 2. This decision threshold voltage feeding-capable CDR 30 conducts error detection by performing an exclusive-OR on a discrimination result to discriminate between a match and a mismatch at adjacent decision points, and outputs an error pulse if a mismatch results.

In FIG. 19, the decision threshold voltage control circuit 340 comprises an error counting part 350, an operation processing part 360 with an operation processing circuit 361, a measuring time setting part 370, and a D/A converting part 380.

The error counting part 350 has an H-level error counter 351 and an L-level error counter 352, which it uses for counting error pulses near the H level ("H-level error pulses") and error pulses near the L level ("L-level error pulses"), respectively, to be sent from the decision threshold voltage feeding-capable CDR 30.

The operation processing circuit 361 in the operation processing part 360 performs the following steps as appropriate according to the H-level error pulse count and the L-level error pulse count.

(1) Changing the distance between the decision point near the H level (upper decision point) and the central decision point, or between the decision point near the L level (lower decision point) and the central decision point.

(2) Moving the upper, lower and central decision points simultaneously, while maintaining the spacing between the adjacent decision points.

(3) Performing one type or a combination of multiple types of the step of changing the counting time as appropriate according to the number of errors counted.

The measuring time setting part 370 sets the counting time of the error counting part at the optimum measuring time according to the H-level error pulse count and the L-level error pulse count.

The D/A converting part 380 converts the upper decision point voltage Vm, the central decision point voltage Vth, and the lower decision point voltage Vs to be output from the operation processing part, into analog voltages, respectively. This D/A converting part 380 comprises an D/A conversion circuit 381 for converting the upper decision point voltage Vm into an analog voltage, a D/A conversion circuit 382 for converting the central decision point voltage Vth into an analog voltage, and a D/A conversion circuit 383 for converting the lower decision point voltage Vs into an analog voltage.

While, in the descriptions of the configuration above, the decision threshold voltage control circuit has been deemed as a separate circuit from the decision threshold voltage feeding-capable CDR 30, it is of course possible to configure the decision threshold voltage control circuit as an integral part of the decision threshold voltage feeding-capable CDR 30.

With reference to FIG. 2, the configuration of the decision threshold voltage feeding-capable CDR 30 will now be described briefly.

In FIG. 2, the decision threshold voltage feeding-capable CDR 30 comprises a ternary decision circuit 300 for discriminating among the upper decision point near the H level, the central decision point near the central level, and the lower decision point near the L level, within the input data signal; a level fluctuation detection circuit 320 for detecting level fluctuations and outputting the results to the above-mentioned decision threshold voltage control circuit 340; and a PLL circuit 330.

In this configuration, the ternary decision circuit 300 further comprises comparators 301, 302, 303 and flip-flops 311, 312, 313, and the level fluctuation detection circuit 320 further comprises exclusive-OR circuits 321, 322.

The configuration of an optical receiving device, to which a decision threshold voltage control circuit 340 according to the present invention is applied, is as shown in FIG. 1. This optical receiving device 1 comprises a photo-electro conversion circuit 20 for receiving and converting an optical data signal into an electric signal and outputting the resultant signal as an input data signal, and the above-described decision threshold voltage feeding-capable CDR 30 and the above-described decision threshold voltage control circuit 340, wherein a data signal after discrimination is output from the decision threshold voltage feeding-capable CDR 30.

The operation of the decision threshold voltage control circuit according to the embodiment of the present invention will now be described with reference to FIG. 20 through FIG. 26.

Figure 20:
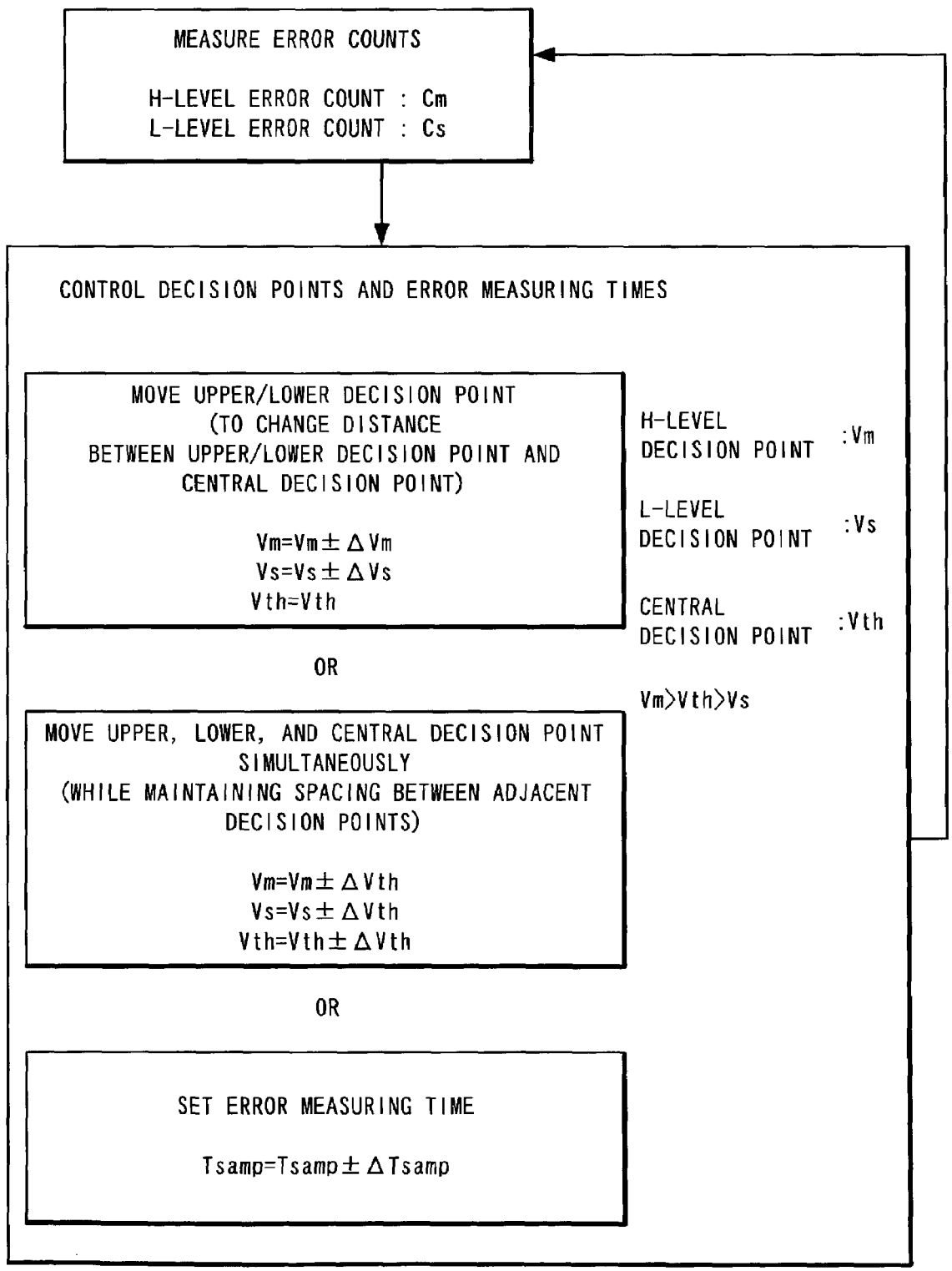
FIG. 20 is a diagram illustrating the basic idea of the control algorithm for the operation processing part of a decision threshold voltage control circuit according to the fourth embodiment of the present invention.
Figure 21:
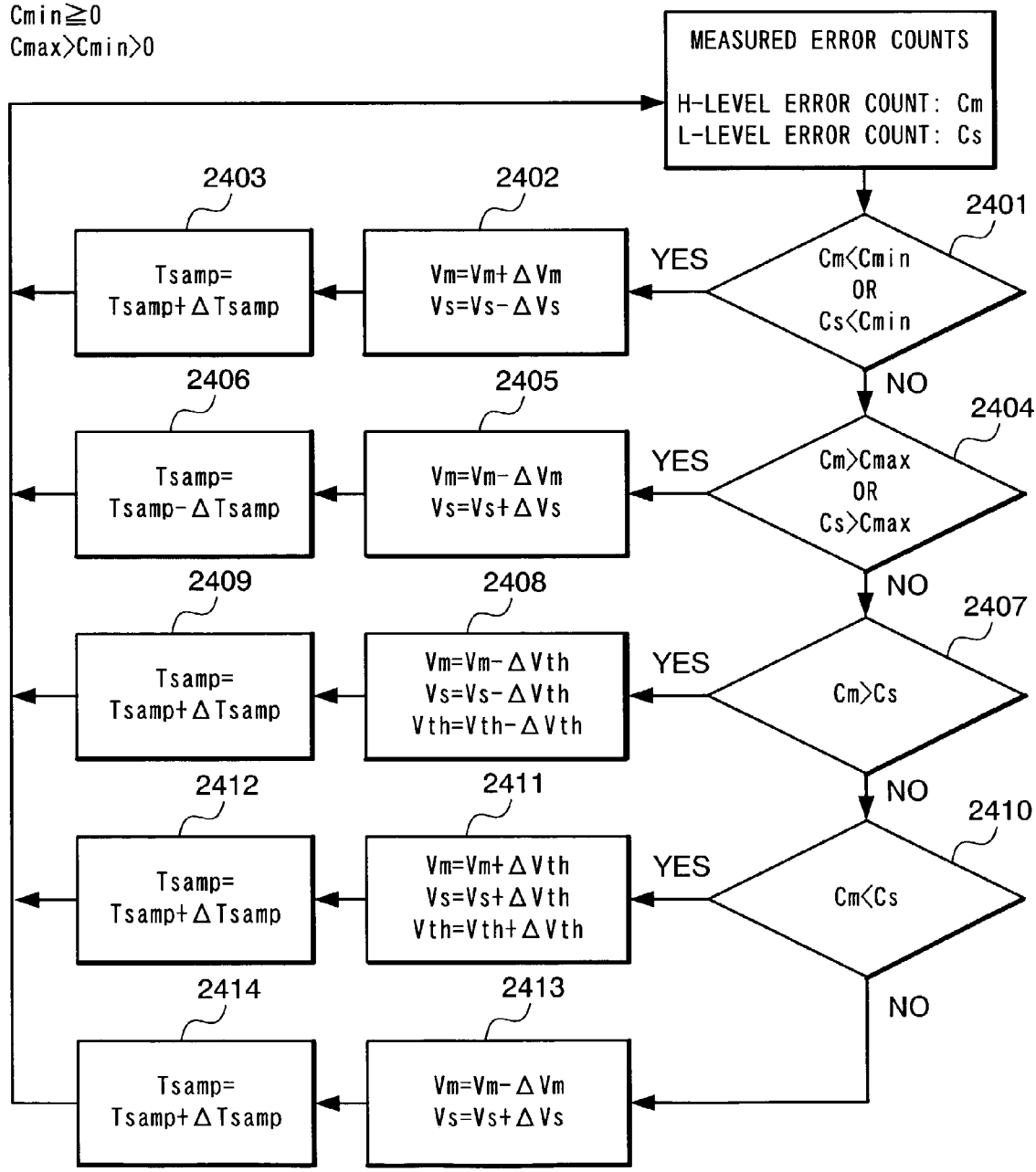
FIG. 21 is a flow chart illustrating the operation of the decision threshold voltage control circuit according to the fourth embodiment of the present invention.

FIG. 20 is a diagram illustrating the basic idea of the control algorithm for the above-mentioned decision threshold voltage control circuit 340 that characterizes the present invention in the operation processing part 360. FIG. 21 shows an example flow chart using the control algorithm of the present invention. FIG. 22 through FIG. 25 are diagrams showing the positional relationships among the eye opening part, the upper decision point voltage Vm, the central decision point voltage Vth, and the lower decision point voltage Vs at each step in the flow chart of FIG. 21. The value of the central decision point voltage Vth should be set as appropriate by considering various factors, including the level of optical data signals to be input and the data quality. In other words, this value should be determined as appropriate according to the system in which you will use the decision threshold voltage feeding-capable CDR 30.

Figure 22:
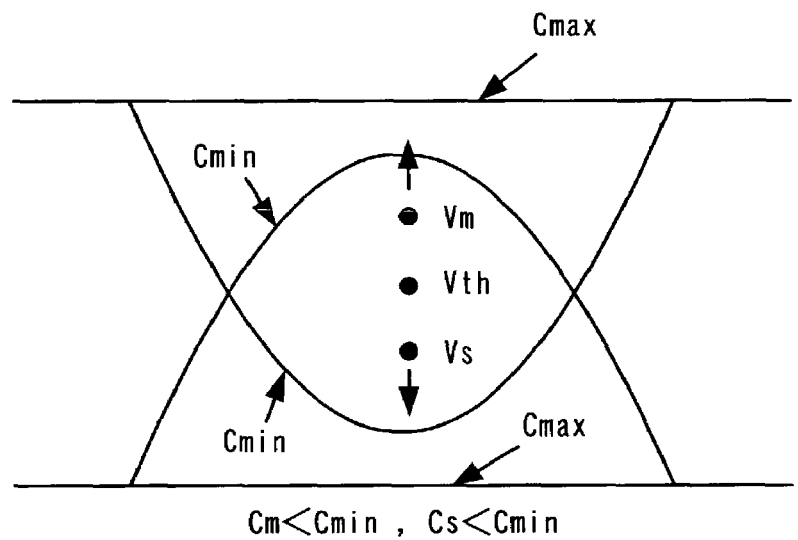
FIG. 22 is a diagram showing the positional relationship between the eye opening part and the upper, central and lower decision point voltages at each step in the flow chart of FIG. 21.

In the descriptions below, the following definitions will be used:
H-level error count: Cm
L-level error count: Cs
Maximum measurement: Cmax (Cmax>Cmin>0)
Minimum measurement: Cmin(Cmin>=0)
H-level decision point voltage: Vm
L-level decision point voltage: Vs
Central decision point voltage: Vth(Vm>Vth>Vs)
Error measuring time: Tsamp We assume that the relative positions of upper, central, and lower decision point voltages, Vm, Vth, Vs, are as shown in FIG. 22. More specifically, the three decision points are inside the eye opening, and the central decision point voltage Vth is not at the optimum position but is slightly above it.

The resultant H-level error count Cm and L-level error count Cs in this state satisfy Cm<Cmin and Cs<Cmin, leading to Y (Yes) in the first evaluation in Step 2401. Therefore, in order to detect the edge of the eye opening, the operation is performed to raise Vm by ΔVm and lower Vs by ΔVs (i.e., to increase the distance between the outer decision points) (Step 2402). This operation results in the state shown in FIG. 23.

At this time, both the H-level error count Cm and the L-level error count Cs are below the minimum measurement Cmin. Therefore, the measuring time Tsamp is increased by ΔTsamp in order to increase the number of error pulses that are subjected to measurement during the measuring time and consequently to improve the measuring accuracy (Step 2403).

Figure 23:
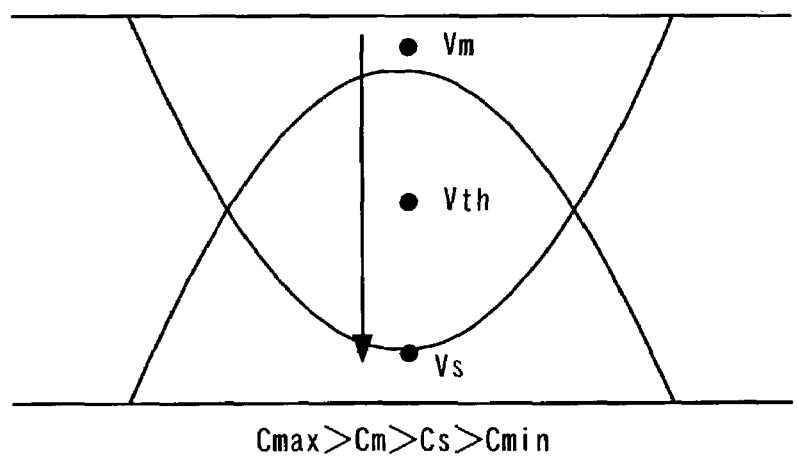
FIG. 23 is a diagram showing the positional relationship between the eye opening part and the upper, central and lower decision point voltages at each step in the flow chart of FIG. 21.

Next, in FIG. 23, the upper decision point voltage Vm and the lower decision point voltage Vs are outside the eye opening, so the resultant H-level error count Cm and L-level error count Cs satisfy Cmax>Cm>Cs>Cmin. This results in N(No) for both the first evaluation at Step 2401 and the second evaluation at Step 2404, and in Y(Yes) for the third evaluation at Step 2407. This causes the control to take place in which the upper, central, and lower decision point voltages Vm, Vth, Vs, are lowered by ΔVth simultaneously (Step 2408), resulting in the state shown in FIG. 24.

At this time as well, the measuring time Tsamp is increased by ΔTsamp in order to improve the measuring accuracy, since neither of the H-level error count Cm or the L-level error count Cs is above the maximum measurement Cmax (Step 2409).

Figure 24:
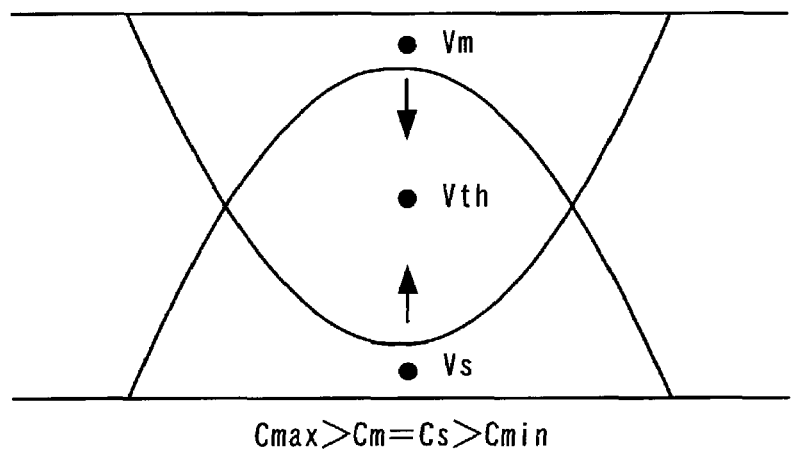
FIG. 24 is a diagram showing the positional relationship between the eye opening part and the upper, central and lower decision point voltages at each step in the flow chart of FIG. 21.

In FIG. 24, the central decision point voltage Vth is near the optimum position, but both the upper decision point voltage Vm and the lower decision point voltage Vs are yet to detect the edges of the eye opening. The resultant H- and L-level error counts Cm, Cs at this time satisfy Cmax>Cm=Cs>Cmin, resulting in N(No) for the evaluation in all the steps in the flow chart of FIG. 21, i.e., from the first evaluation at Step 2401 through the fourth evaluation at Step 2410. Therefore, in order to detect the edges of the eye opening, the upper decision point voltage Vm is lowered by ΔVm, and the lower decision point voltage Vs is raised by ΔVs (i.e., the distance between the outer decision points is reduced) (Step 2413).

Here again, in order to improve the measuring accuracy, the measuring time Tsamp is increased by ΔTsamp (Step 2414).

Figure 25:
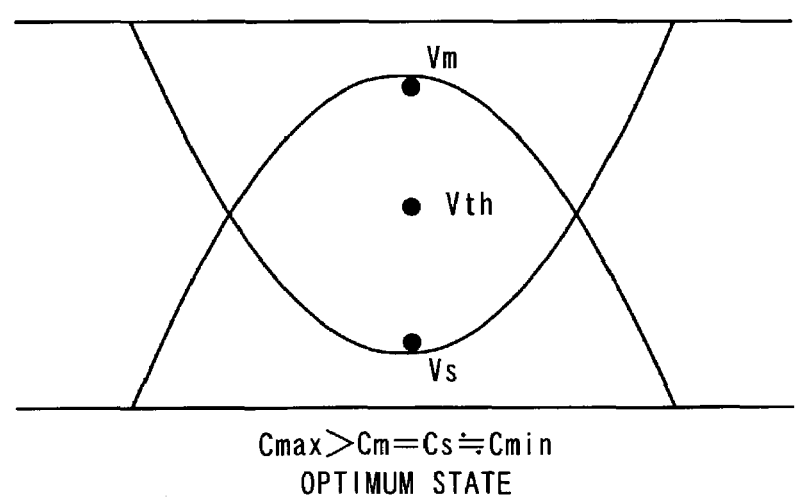
FIG. 25 is a diagram showing the positional relationship between the eye opening part and the upper, central and lower decision point voltages at each step in the flow chart of FIG. 21.

By repeating these steps, the central decision point voltage Vth becomes the optimum decision point when the measured error counts at the upper decision point voltage Vm and the lower decision point voltage Vs satisfy the equation, Cmax>Cm=Cs≈Cmin (FIG. 25).

If, in FIG. 21, either of the H-level error count Cm or the L-level error count Cs exceeds the maximum measurement Cmax (i.e., "Yes" at Step 2404), then the operation will take place in which the upper decision point voltage Vm is lowered by ΔVm and the lower decision point voltage Vs is raised by ΔVs (i.e., the distance between the outer decision points is reduced) (Step 2405), in addition to the measuring time Tsamp being decreased by ΔTsamp (Step 2406). By this operation, the device can escape from an adverse condition quickly and prevent the counter from overflowing.

By performing the operations as described above, a device according to this embodiment can ensure that the central decision point voltage Vth becomes the optimum decision point, thereby improving its error rate over conventional devices using fixed decision points as shown in FIG. 37.

The decision points and the error measuring times in FIG. 20 may be controlled individually or simultaneously.

More specifically, two different types of control, e.g., the control to lower the upper decision point voltage Vm by ΔVm and raise the lower decision point voltage Vs by ΔVs (i.e., to reduce the distance between the outer decision points), and the control to raise the upper, central, and lower decision point voltages Vm, Vth, Vs by ΔVth, may be performed simultaneously.

For example, in FIG. 21, if either of the H-level error count Cm or the L-level error count Cs exceeds the maximum measurement Cmax, then the time required for escaping from an adverse condition would be reduced by combining the following three types of control: (1) lowering the upper decision point voltage Vm by ΔVm and raising the lower decision point voltage Vs by ΔVs (i.e., reducing the distance between the outer decision points), (2) decreasing the measuring time Tsamp by ΔTsamp, and (3) lowering simultaneously the upper, central, and lower decision point voltages Vm, Vth, Vs by ΔVth.

In addition, if the measuring results for the H-level error count Cm and the L-level error count Cs satisfy Cmax>Cm>Cs>Cmin, the measuring time Tsamp may be left unchanged since these results are appropriate as are.

The first and second evaluations in FIG. 21 may take place in converse order. Similarly, the third and fourth evaluations may change places.

These operations can also be performed in the order of the first evaluation (Step 2401), and then the third and fourth evaluations (Steps 2407 and 2410) (or the fourth and third evaluations), and then the second evaluation (Step 2404). It is also possible to perform in the order of the second evaluation (Step 2404), and then the third and fourth evaluations (Steps 2407 and 2410) (or the fourth and third evaluations), and then the first evaluation (Step 2401).

Furthermore, $\Delta Vm$ and $\Delta Vs$ may be equal or unequal. If $\Delta Vm$ and $\Delta Vs$ are set to have the same value, then the central decision point Vth will be positioned halfway between the upper decision point voltage Vm and the lower decision point Vs.

It goes without saying that the values of $\Delta Vm$, $\Delta Vs$, and $\Delta Vth$ will vary, depending on to what degree the required control accuracy will be set. For example, a typical setting would be in the range of $\frac{1}{10}$ and $\frac{1}{1000}$ of an input data signal. The values of measuring times Tsamp and $\Delta$Tsamp will also vary, depending on to what degree the required control accuracy will be set. As a guide, the measuring time Tsamp may be variable in the range between the time when the minimum value of error rate (e.g., BER=$10^{-2}$ to $10^{-3}$) at which an optical receiving device operates is measurable and the time when the error rate (e.g., BER=$10^{-12}$ to $10^{-15}$) at which the device is considered to operate almost free of error is measurable. In addition, $\Delta$Tsamp can be set, for example, in increments $\frac{1}{10}$ to $\frac{1}{1000}$ of the time range above.

Fifth Embodiment

Figure 26:
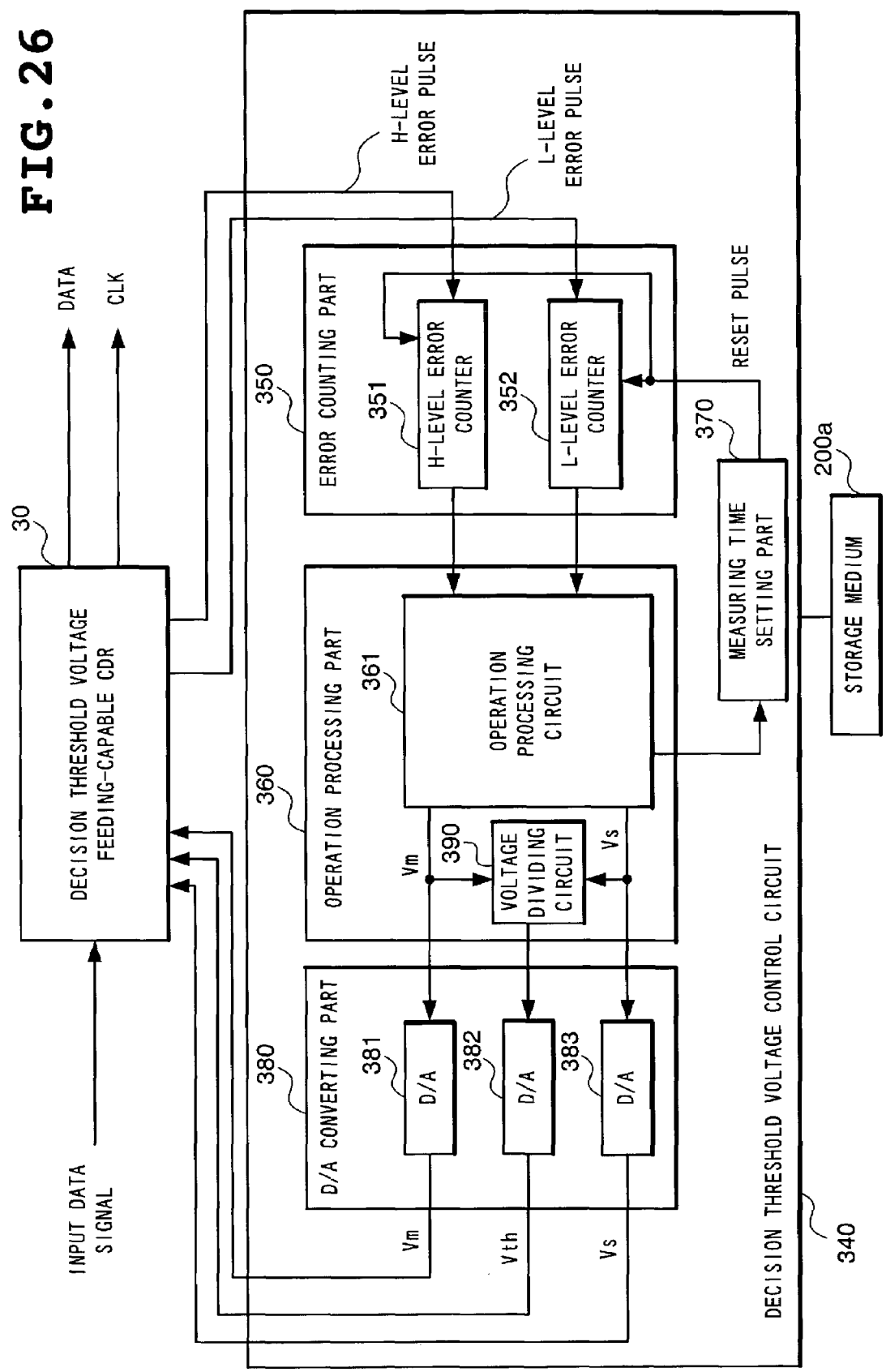
FIG. 26 is a block diagram showing the configuration of a decision threshold voltage control circuit of a decision threshold voltage feeding-capable CDR according to the fifth embodiment of the present invention.
Figure 27:
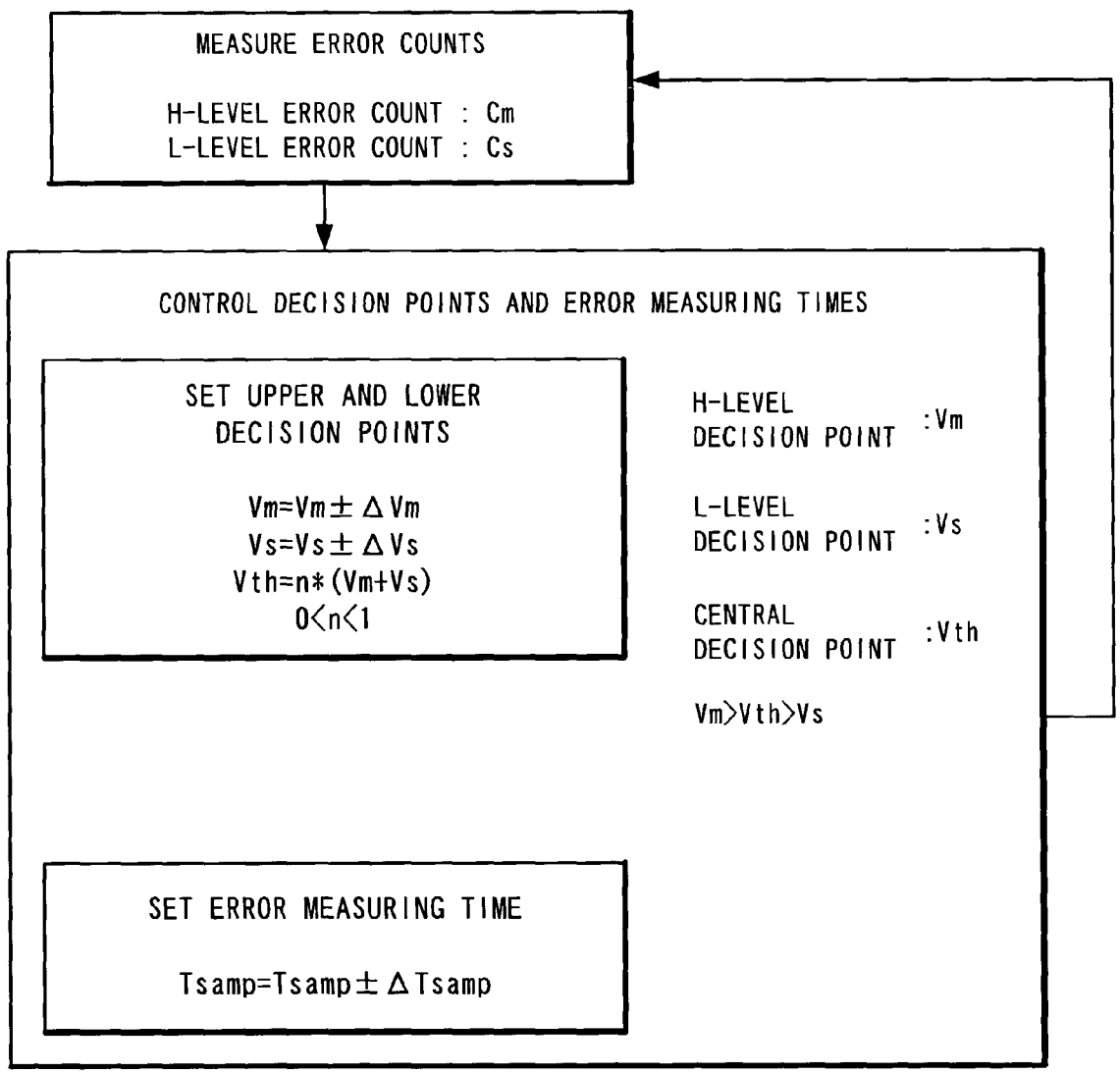
FIG. 27 is a diagram illustrating the basic idea of the control algorithm for the operation processing part of a decision threshold voltage control circuit according to the fifth embodiment of the present invention.
Figure 28:
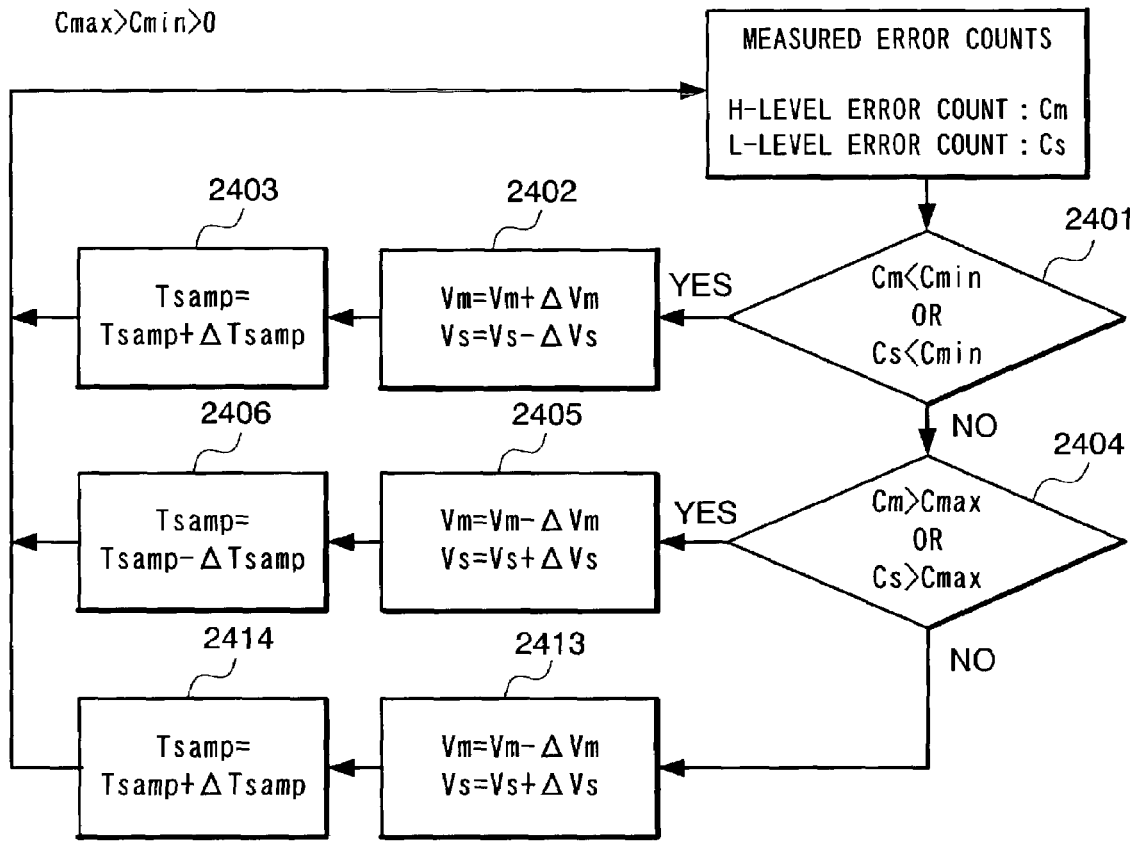
FIG. 28 is a flow chart illustrating the operation of the decision threshold voltage control circuit according to the fifth embodiment of the present invention.

The fifth embodiment of the present invention will now be described. FIG. 26 is a diagram showing the configuration of a decision threshold voltage control circuit according to the fifth embodiment of the present invention. FIG. 27 is a diagram illustrating the basic idea of the control algorithm of the fifth embodiment. FIG. 28 is an example flow chart using the control algorithm of the fifth embodiment.

This fifth embodiment represents a more simplified configuration of the above-mentioned fourth embodiment. More specifically, this embodiment differs from the fourth embodiment in that it omits the step of moving the upper and lower decision point voltages Vm, Vs and the central decision point voltage Vth simultaneously, while maintaining the spacing between the adjacent decision point voltages. The other steps, i.e., moving the upper and lower decision point voltages Vm, Vs, and changing the error measuring time Tsamp, are the same as the corresponding steps in FIG. 21.

In the decision threshold voltage control circuit 340 according to the fifth embodiment, the central decision point voltage Vth is set by the operation processing part 360 at any pre-determined point between the upper and lower decision points Vm, Vs. This decision threshold voltage control circuit is configured in such a way that, after converting to an analog voltage, it uses the voltage dividing circuit 390 to set the central decision point voltage Vth to any desired point between the upper and lower decision point voltages Vm, Vs.

Sixth Embodiment

Figure 29:
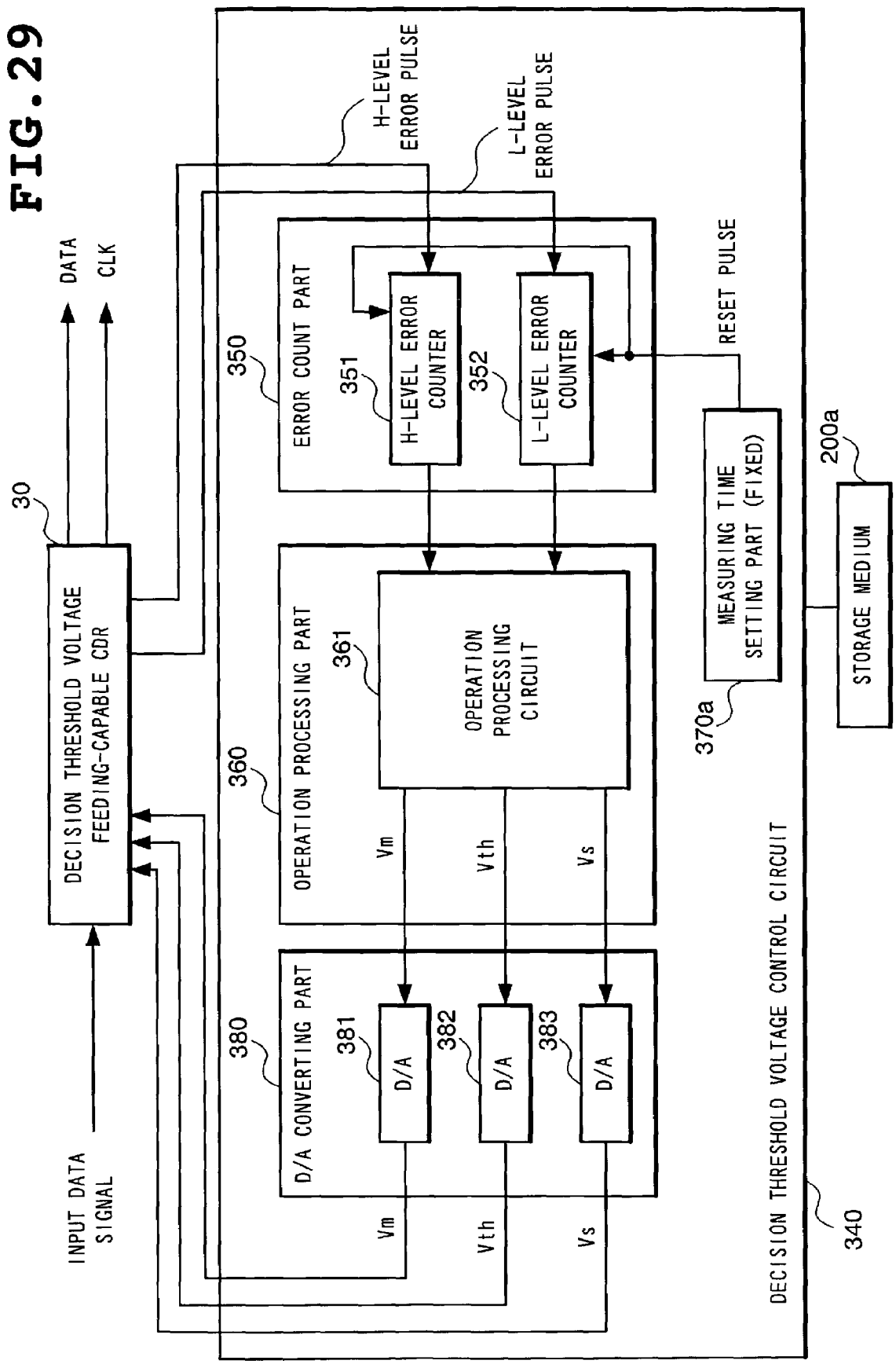
FIG. 29 is a block diagram showing the configuration of the decision threshold voltage control circuit of a decision threshold voltage feeding-capable CDR according to the sixth embodiment of the present invention.
Figure 30:
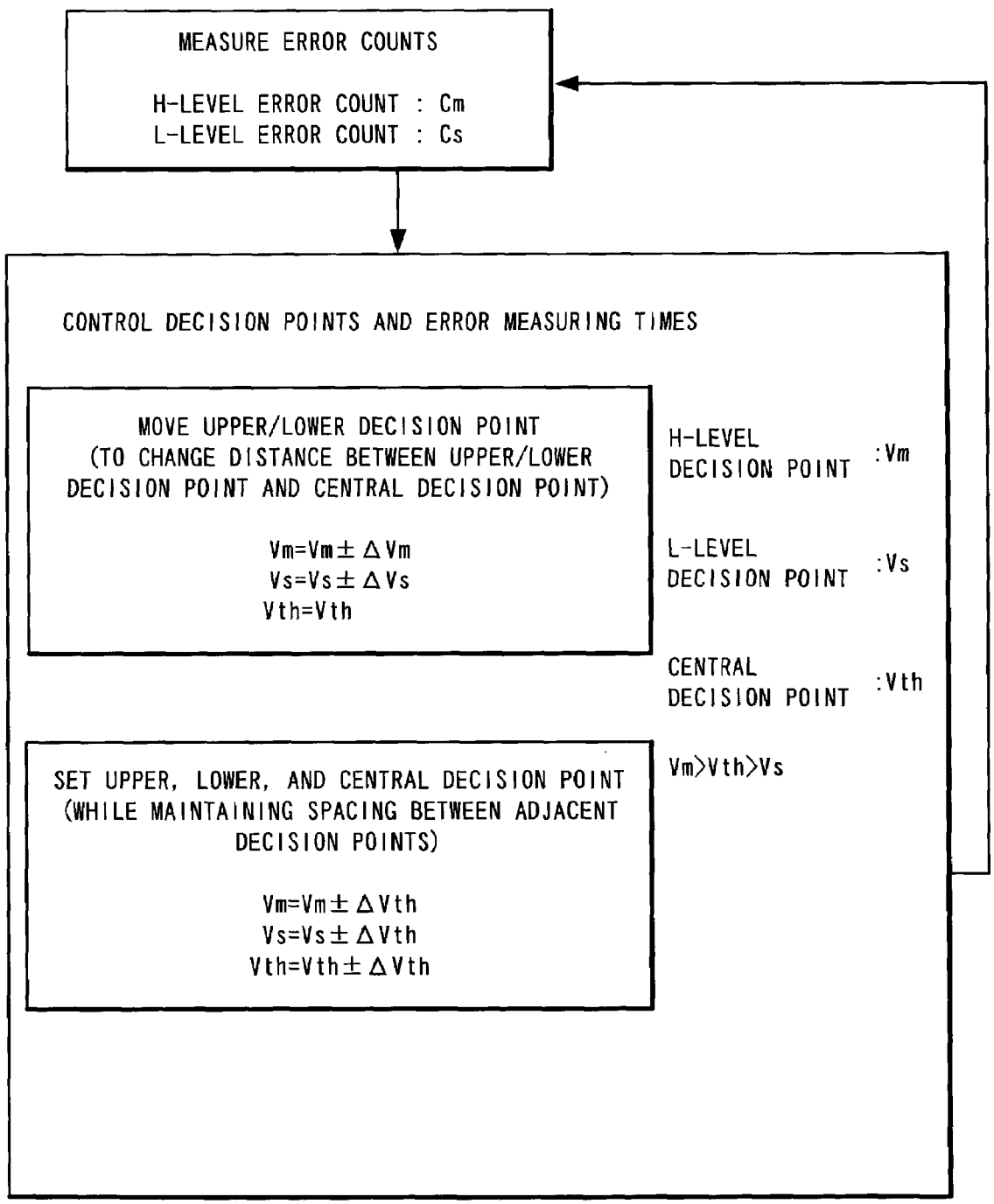
FIG. 30 is a diagram illustrating the basic idea of the control algorithm for the operation processing part of the decision threshold voltage control circuit according to the sixth embodiment of the present invention.
Figure 31:
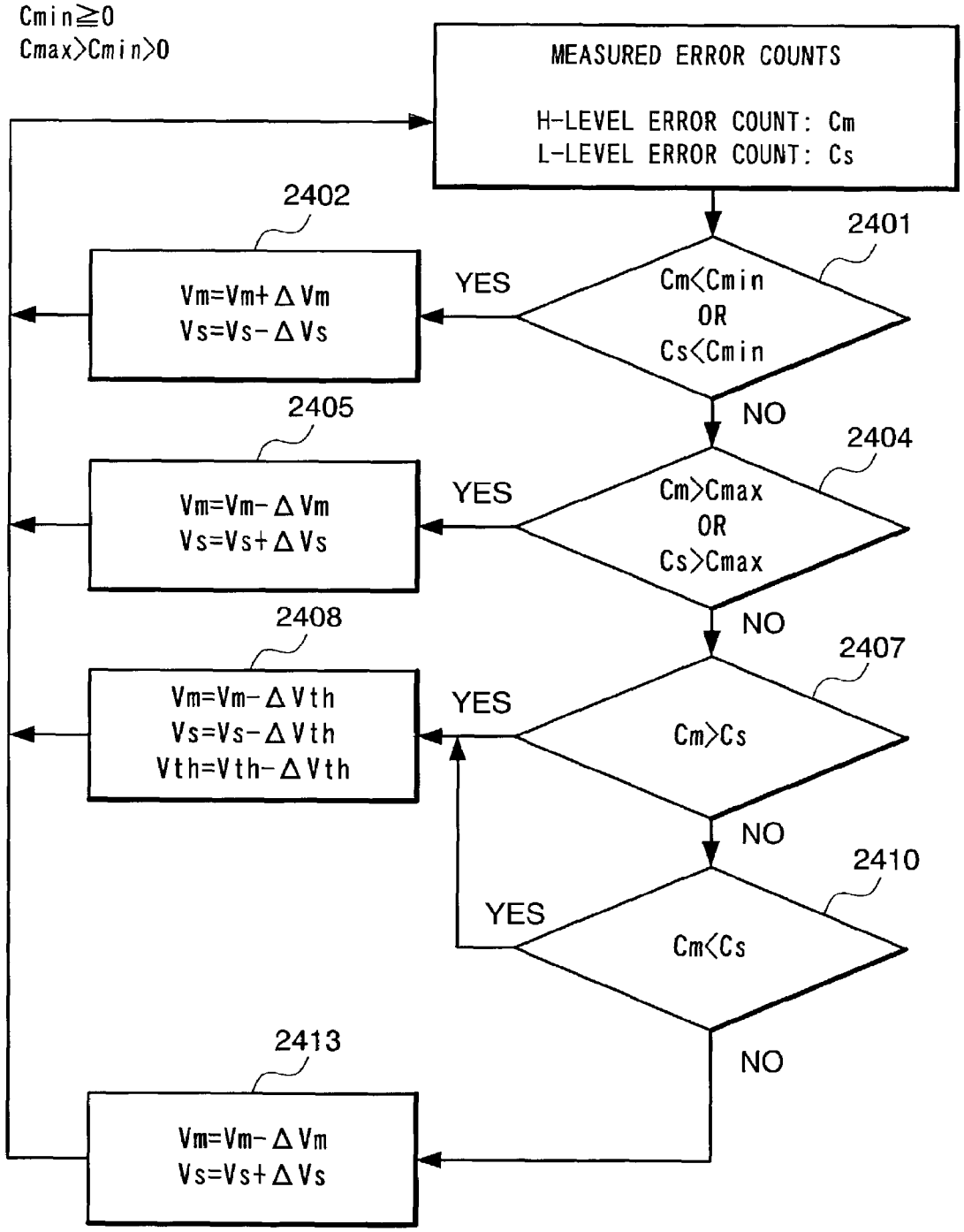
FIG. 31 is a flow chart illustrating the operation of the decision threshold voltage control circuit according to the sixth embodiment of the present invention.

The sixth embodiment of the present invention will now be described. FIG. 29 is a diagram showing the configuration of a decision threshold voltage control circuit according to the sixth embodiment of the present invention. FIG. 30 is a diagram illustrating the basic idea of the control algorithm of the sixth embodiment. FIG. 31 is an example flow chart using the control algorithm of the sixth embodiment.

The sixth embodiment uses the decision threshold voltage control circuit 340 of the fourth embodiment in a different configuration. More specifically, a fixed measuring time is set in the measuring time setting part 370a, the measuring time for the error counting part 350 is fixed, and the error measuring time Tsamp is not changed.

Seventh Embodiment

Figure 32:
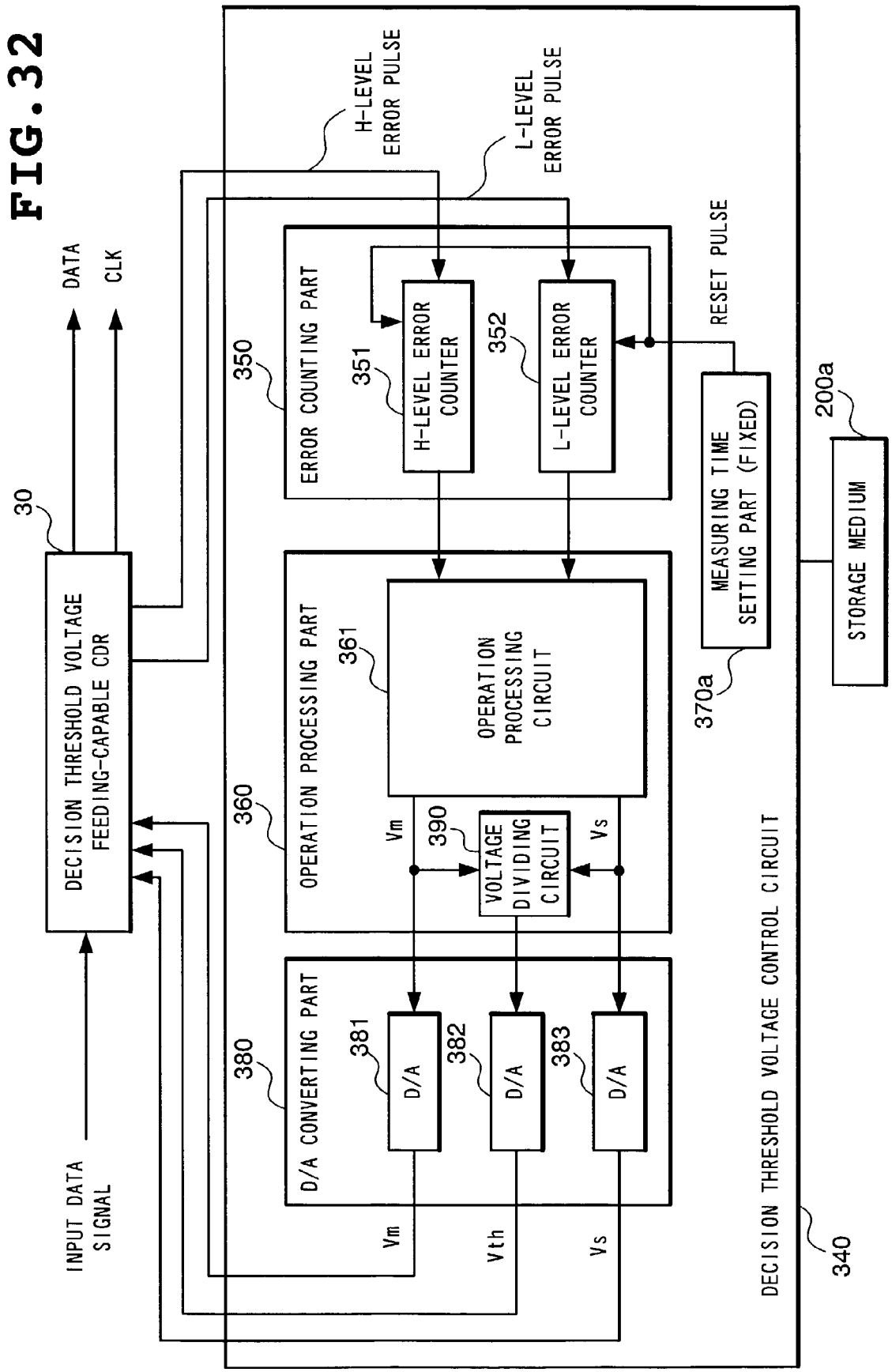
FIG. 32 is a block diagram showing the configuration of a decision threshold voltage control circuit of a decision threshold voltage feeding-capable CDR according to the seventh embodiment of the present invention.
Figure 33:
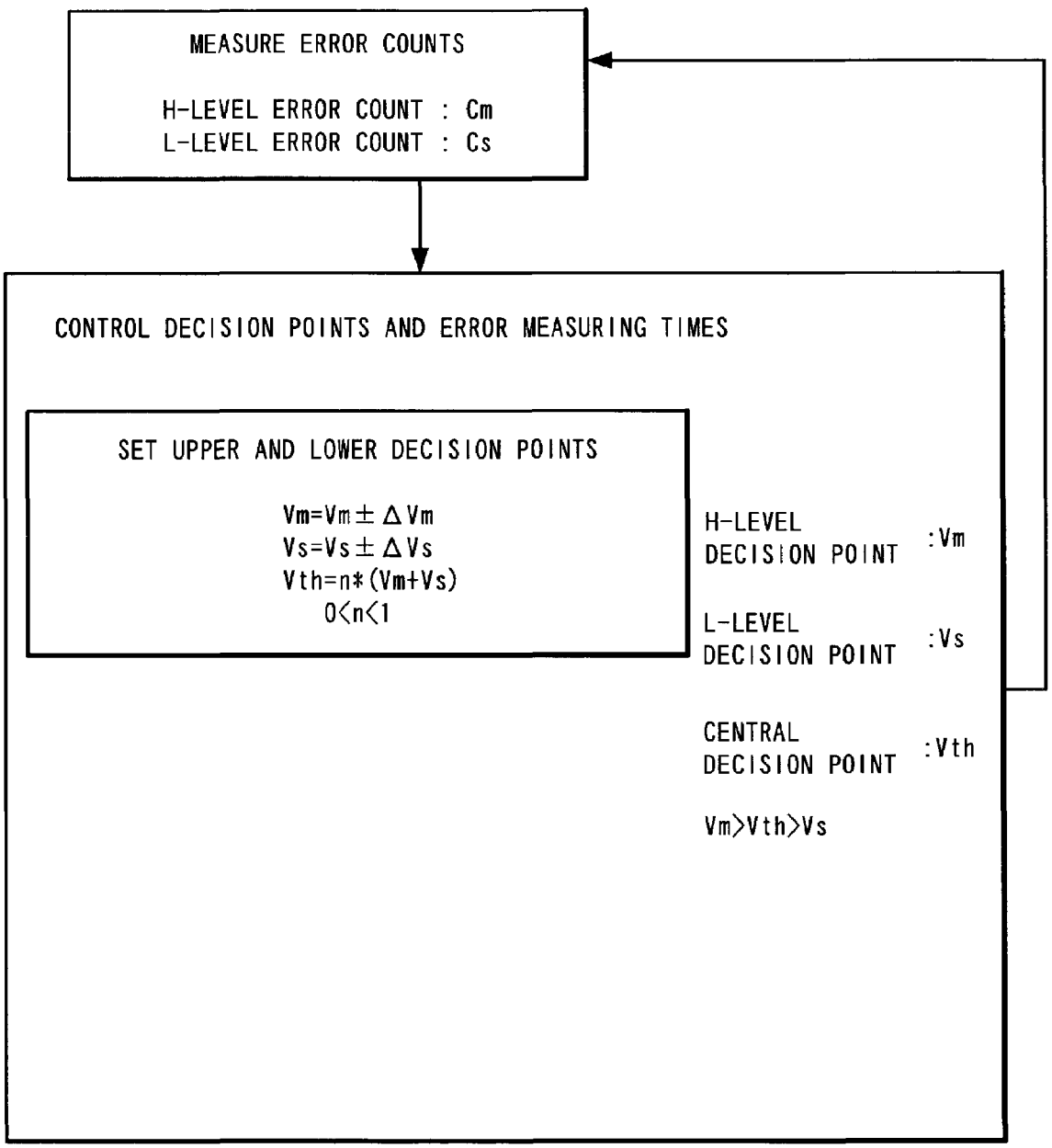
FIG. 33 is a diagram illustrating the basic idea of the control algorithm for the operation processing part of a decision threshold voltage control circuit according to the seventh embodiment of the present invention.
Figure 34:
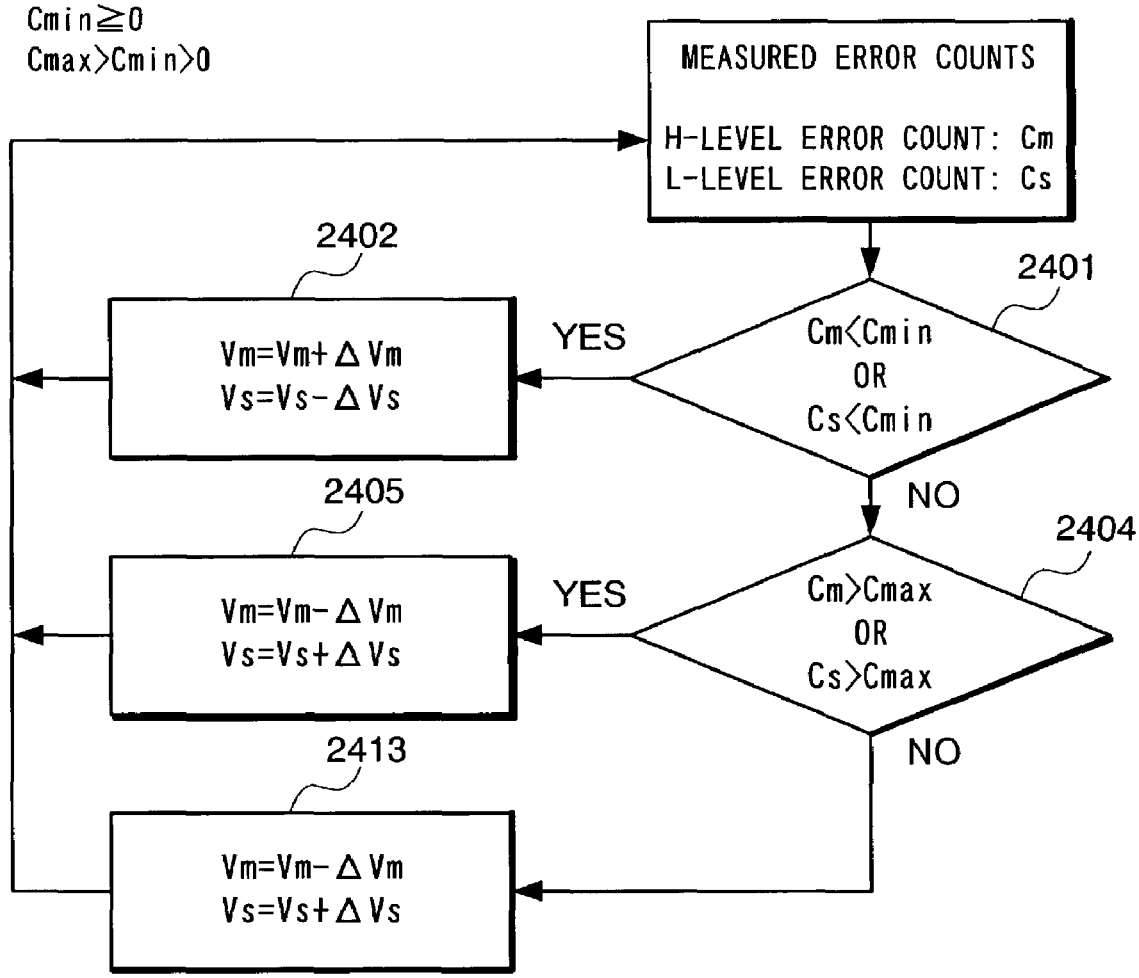
FIG. 34 is a flow chart illustrating the operation of the decision threshold voltage control circuit according to the seventh embodiment of the present invention.
Figure 35:
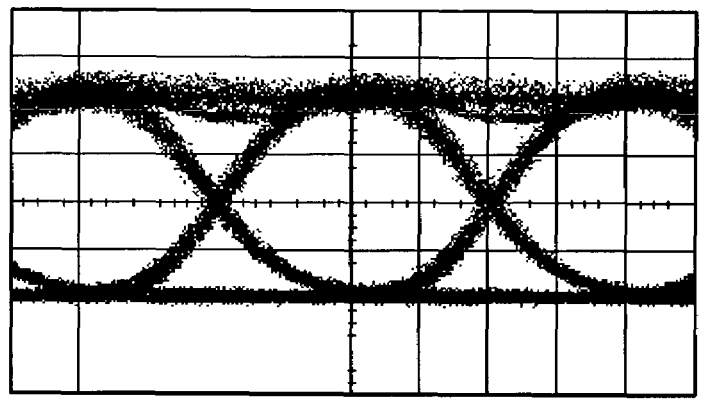
FIG. 35 is a diagram showing an example of optical receive waveform after transmission.
Figure 36:
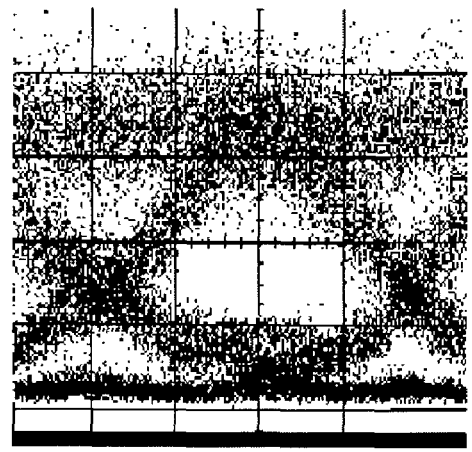
FIG. 36 is a diagram showing an example of optical receive waveform after transmission.

The seventh embodiment of the present invention will now be described. FIG. 32 is a diagram showing the configuration of a decision threshold voltage control circuit according to the seventh embodiment of the present invention. FIG. 33 is a diagram illustrating the basic idea of the control algorithm of the seventh embodiment. FIG. 34 is an example flow chart using the control algorithm of the seventh embodiment.

The seventh embodiment uses the decision threshold voltage control circuit 340 of the fifth embodiment, but it differs from the fifth embodiment in that the measuring time for the error counting part 350 is fixed, and that the error measuring time Tsamp is not changed.

The control achieved by the decision threshold voltage control circuit 340 according to the fourth through seventh embodiments can be realized by loading the decision threshold voltage control program, a computer program including the various functions of the control circuit, in the memory of a computer-based processor, in addition to being implemented as hardware including these function. This decision threshold voltage control program is stored in a magnetic disc, a semi-conductor memory, or other storage medium 200a. By being loaded from the storage medium to a computer-based processor, the program controls the operation of the computer-based processor, thereby realizing the above-mentioned various functions of the decision threshold voltage control circuit 340.

While the embodiments above have been described with focus on cases where the dispersed value D and the incremental values $\Delta D$ and r$\Delta D$ are fixed, it is also possible to determine the position of the optimum dispersed value in greater precision through a stepwise decrease in the incremental value $\Delta D$ as the size of the eye opening changes in the increase direction.

For example, the descriptions of the embodiments above concern the application of the present invention to an optical receiving device, the present invention can also be applied to repeating installations for optical signals. Such a repeating installation is configured similarly to the one shown in FIG. 1, except that a signal amplifier is added to an optical receiving device as described in these embodiments.

As described in the foregoing, the present invention enables an optical signal to be discriminated in the best condition even after it is affected by waveform distortion as it travels along the transmission line, because its eye opening can be controlled to always have the maximum size by adjusting the dispersed value of the dispersion equalizer as appropriate according to the size of the eye opening.

In addition, the dispersed value D can be controlled in greater accuracy to be near the optimum dispersed value by setting the dispersed value so that it is varied in smaller increments or decrements as the eye opening increases or decreases.

Furthermore, it is possible to determine the position of the optimum dispersed value in greater precision through a stepwise decrease in the incremental value ΔD as the size of the eye opening changes in the increase direction.

In addition to the above-mentioned effects, the following effects can be achieved by using an optical receiving device according to the present invention.

Firstly, the ability to control the discrimination positions optimally at different light receiving levels improves the error rate characteristics over conventional decision circuits where decision points are fixed, thereby preventing any floor from occurring.

Secondly, the ability to detect the edges of an eye opening allows the decision point Vth to be controlled to achieve the optimum position.

Thirdly, the fact that the measuring time is adjusted based on measuring results from the error counting part contributes to a higher measuring accuracy, making it possible to escape from an adverse condition quickly.

Fourthly, the measuring time is changed as appropriate according to the measured error count, thereby eliminating the necessity of using an unnecessarily large counter.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An optical receiving device for discriminating and recovering a data signal, comprising:
a dispersion equalizer for equalizing dispersion in said data signal;
a circuit for converting said data signal from an optical signal into an electrical signal and amplifying said electrical signal to a pre-determined amplitude;
a clock and data recovery circuit for discriminating and recovering said data signal at a decision point controlled to achieve an optimum position; and
a controller for controlling a dispersion characteristic of said dispersion equalizer such that an error count in the data signal recovered by said clock and data recovery circuit is minimized by controlling an eye pattern of the data signal that has been amplified to a pre-determined amplitude,
wherein said controller obtains an eye opening in said eye pattern by controlling a spacing between decision points to be accommodated in said eye opening.

2. The optical receiving device as set forth in claim 1, wherein said controller comprises:
a waveform optimization controlling part for detecting said eye opening in the eye pattern of said data signal based on the discrimination information concerning the data signal from said clock and data recovery circuit and controlling the dispersion characteristics of said dispersion equalizer as appropriate according to the size of said eye opening such that the error count in said data signal will be minimized.

3. The optical receiving device as set forth in claim 2, wherein said waveform optimization controlling part comprises:

an eye opening detecting part for obtaining the size of the eye opening sufficient for three decision points on a time base of the eye pattern, said points comprising a left decision point, a central decision point, and a right decision point, to be accommodated in said eye opening by way of controlling a spacing between adjacent decision points; and
an operation processing part for controlling a dispersed value of said dispersion equalizer to achieve an optimum value of said dispersed value by increasing or decreasing said dispersed value as appropriate according to said size of the eye opening thus obtained.

4. The optical receiving device as set forth in claim 3, wherein said operation processing part compares current and previous sizes of the eye opening, and increases or decreases the dispersed value of said dispersion equalizer as appropriate according to the increase or decrease in said size of the eye opening.

5. The optical receiving device as set forth in claim 3, wherein said operation processing part:
compares current and previous sizes of the eye opening;
increments the dispersed value of said dispersion equalizer by a first pre-determined value if said size of the eye opening has increased; and
decrements the dispersed value of said dispersion equalizer by a second pre-determined value if said size of the eye opening has decreased.

6. The optical receiving device as set forth in claim 3, wherein said operation processing part:
compares current and previous sizes of the eye opening, and according to the increase or decrease in said size of the eye opening, performs a first process of increasing or decreasing the dispersed value of said dispersion equalizer; and
performs a second process of inversing the increasing or decreasing of the dispersed value of said dispersion equalizer.

7. The optical receiving device as set forth in claim 3, wherein said operation processing part:
compares current and previous sizes of the eye opening;
increments the dispersed value of said dispersion equalizer if said size of the eye opening has increased;
decrements the dispersed value of said dispersion equalizer if said size of the eye opening has decreased; and
when said dispersed value is to be increased, decreases an incremental value of said dispersed value stepwise as appropriate according to the increase in the size of said eye opening.

8. The optical receiving device as set forth in claim 3, wherein said operation processing part;
compares current and previous sizes of the eye opening; and
upon a change in a direction of increase or decrease in said size of the eye opening, performs by switching between a first process of incrementing the dispersed value of said dispersion equalizer by a pre-determined value and a second process of decrementing the dispersed value of said dispersion equalizer by a pre-determined value.

9. The optical receiving device as set forth in claim 1, wherein said clock and data recovery circuit comprises a decision threshold voltage application function, and a function of extracting a clock frequency element from to input data signal amplified to a pre-determined amplitude, discriminating the input data signal between 1 and 0 at the timing of this clock, and applying a decision threshold voltage, and wherein said optical receiving device further comprises:
a decision threshold voltage control circuit for controlling said decision point to achieve an optimum value by performing selectively, according to a result of measuring error pulses, a process of controlling a distance between outer decision points, moving three decision points while maintaining a spacing between adjacent decision points, and changing error pulse measuring times.

10. The optical receiving device as set forth in claim 1, wherein said clock and data recovery circuit comprises a decision threshold voltage application function, and functions of extracting a clock frequency element from the input data signal amplified to a pre-determined amplitude, discriminating the input data signal between 1 and 0 at the timing of this clock, and applying a decision threshold voltage, and
wherein said optical receiving device further comprises:
a decision threshold voltage control circuit for controlling said decision point to achieve an optimum value by performing selectively, according to a result of measuring error pulses, a process of controlling a distance between outer decision points and changing error pulse measuring times.

11. The optical receiving device as set forth in claim 1, wherein said clock and data recovery circuit comprises a decision threshold voltage application function, and a function of extracting a clock frequency element from the input data signal amplified to a pre-determined amplitude, discriminating the input data signal between 1 and 0 at the timing of this clock, and applying a decision threshold voltage, and
wherein said optical receiving device further comprises:
a decision threshold voltage control circuit for controlling said decision point to achieve an optimum value by performing selectively, according to a result of measuring error pulses, a process of controlling a distance between outer decision points, moving three decision points while maintaining a spacing between adjacent decision points.

12. The optical receiving device as set forth in claim 1, wherein said clock and data recovery circuit comprises a decision threshold voltage application function, and a function of extracting a clock frequency element from the input data signal amplified to a pre-determined amplitude, discriminating the input data signal between 1 and 0 at the timing of this clock, and applying a decision threshold voltage, and
wherein said optical receiving device further comprises:
a decision threshold voltage control circuit for controlling said decision point to achieve an optimum value by controlling a distance between outer decision points as appropriate according to a result of measuring error pulses.

13. The optical receiving device as set forth in claim 1, wherein said clock and data recovery circuit comprises a decision threshold voltage application function, and a function of extracting a clock frequency element from the input data signal amplified to a pre-determined amplitude, discriminating the input data signal between 1 and 0 at the timing of this clock, and applying a decision threshold voltage, and
wherein said optical receiving device further comprises:
an error counting part for performing a counting process on error counts near an H level and error counts near an L level of said input data signal;
an operation processing part for, according to the results of counting errors, changing a distance of an upper decision point near the H level from a central decision point or from a lower decision point near the L level, according to said results of counting errors, moving said upper and lower decision points and the central decision points simultaneously while maintaining a spacing between adjacent decision points, and according to said results of counting errors, changing a measuring time for error counts; and
a decision threshold voltage control circuit for setting said central decision point at the optimum position, while detecting the inner edges of the eye opening of said input data signal.

14. The optical receiving device as set forth in claim 1, wherein said clock and data recovery circuit comprises a decision threshold voltage application function, and a function of extracting a clock frequency element from the input data signal amplified to a pre-determined amplitude, discriminating the input data signal between 1 and 0 at the timing of this clock, and applying a decision threshold voltage, and
wherein said optical receiving device further comprises:
an error counting part for performing a counting process on error counts near an H level and error counts near an L level of said input data signal;
an operation processing part for, according to the results of counting errors, changing a distance of an upper decision point near the H level from a central decision point or from a lower decision point near the L level, and according to said results of counting errors, changing a measuring time for error counts; and
a decision threshold voltage control circuit for setting said central decision point at the optimum position while detecting the inner edges of the eye opening of said input data signal.

15. The optical receiving device as set forth in claim 1, wherein said clock and data recovery circuit comprises a decision threshold voltage application function, and a function of extracting a clock frequency element from the input data signal amplified to a pre-determined amplitude, discriminating the input data signal between 1 and 0 at the timing of this clock, and applying a decision threshold voltage, and
wherein said optical receiving device further comprises:
an error counting part for performing a counting process on error counts near an H level and error counts near an L level of said input data signal;
an operation processing part for, according to the results of counting errors, changing a distance of an upper decision point near the H level from a central decision point or from a lower decision point near the L level, and according to said results of counting errors, moving said upper and lower decision points and the central decision points simultaneously, while maintaining a spacing between adjacent decision points; and
a decision threshold voltage control circuit for setting said central decision point at the optimum position, while detecting the inner edges of the eye opening of said input data signal.

16. The optical receiving device as set forth in claim 1, wherein said clock and data recovery circuit comprises a decision threshold voltage application function, and a function of extracting a clock frequency element from the input data signal amplified to a pre-determined amplitude, discriminating the input data signal between 1 and 0 at the timing of this clock and applying a decision threshold voltage, and wherein said optical receiving device further comprises:

an error counting part for performing a counting process on error counts near an H level and error counts near an L level of said input data signal;

an operation processing part for, according to the results of counting errors, changing a distance of an upper decision point near the H level from a central decision point or from a lower decision point near the L level; and a decision threshold voltage control circuit for setting said central decision point at the optimum position, while detecting the inner edges of the eye opening of said input data signal.

17. A waveform optimization program for an optical data signal operating in an optical receiving device for discriminating and recovering a data signal, for performing a waveform optimization method comprising:

using a dispersion equalizer, equalizing dispersion in said data signal;

converting said data signal from an optical signal into an electrical signal and amplifying said electrical signal to a pre-determined amplitude;

using a clock and data recovery circuit, discriminating said data signal at a decision point controlled to achieve an optimum position; and controlling a dispersion characteristic of said dispersion equalizer such that an error count in the data signal recovered by said clock and data recovery circuit is minimized, by controlling an eye pattern of the data signal that has been amplified to a pre-determined amplitude, wherein said controlling said eye pattern comprises obtaining an eye opening in said eye pattern by controlling a spacing between decision points to be accommodated in said eye opening.

18. The waveform optimization program for optical data signal as set forth in claim 17, wherein said method further comprises;

detecting said eye opening in the eye pattern of said data signal based on discrimination information concerning the data signal from said clock and data recovery circuit; and controlling the dispersion characteristics of said dispersion equalizer as appropriate according to the size of said eye opening such that the error count in said data signal will be minimized.

19. The waveform optimization program for optical data signal as set forth in claim 18, wherein said method further comprises;

obtaining the size of the eye opening sufficient for three decision points on a time base of the eye pattern, said points comprising a left decision point, a central decision point, and a right decision point, to be accommodated in said eye opening by way of controlling a spacing between adjacent decision points; and controlling a dispersed value of said dispersion equalizer to achieve an optimum value of said dispersed value by increasing or decreasing said dispersed value as appropriate according co said size of the eye opening thus obtained.

20. The waveform optimization program for optical data signal as set forth in claim 19, wherein said controlling said dispersed value comprises:

comparing current and previous sizes of the eye opening, and increasing or decreasing the dispersed value of said dispersion equalizer as appropriate according to the increase or decrease in said size of the eye opening.

21. The waveform optimization program for optical data signal as set forth in claim 19, wherein said controlling said dispersed value comprises:

comparing current and previous sizes of the eye opening;

incrementing the dispersed value of said dispersion equalizer by a first pre-determined value if said size of the eye opening has increased; and decrementing the dispersed value of said dispersion equalizer by a second pre-determined value if said size of the eye opening has decreased.

22. The waveform optimization program for optical data signal as set forth in claim 19, wherein said controlling said dispersed value comprises:

comparing current and previous sizes of the eye opening, and according to the increase or decrease in said size of the eye opening;

perfonning a first process of increasing or decreasing the dispersed value of said dispersion equalizer; and performing a second process of inversing the increasing or decreasing of the dispersed value of said dispersion equalizer.

23. The waveform optimization program for optical data signal as set forth in claim 19, wherein said controlling said dispersed value comprises:

comparing current and previous sizes of the eye opening, and increasing the dispersed value of said dispersion equalizer if said size of the eye opening has increased;

decrementing the dispersed value of said dispersion equalizer if said size of the eye opening has decreased; and when said dispersed value is to be increased, decreasing an incremental value of said dispersed value stepwise as appropriate according to the increase in the size of said eye opening.

24. The waveform optimization program for optical data signal as set forth in claim 19, wherein said controlling said dispersed value comprises:

comparing current and previous sizes of the eye opening; and upon a change in a direction of increase or decrease in said size of the eye opening changes, switching between a first process of incrementing the dispersed value of said dispersion equalizer by a pre-determined value and a second process of decrementing the dispersed value of said dispersion equalizer by a pre-determined value.

25. A waveform optimization method for an optical data signal, comprising:

using a dispersion equalizer, equalizing dispersion in said data signal;

converting said data signal from an optical data signal input through said dispersion equalizer into an electrical signal and amplifying said electrical signal to a pre-determnined amplitude;

using a clock and data recovery circuit, discriminating said data signal at a decision point controlled to achieve an optimum position; and controlling a dispersion characteristic of said dispersion equalizer such that an error count in the data signal recovered by said clock and data recovery circuit is minimized, by controlling an eye pattern of the data signal that has been amplified to a pre-determined amplitude, wherein said controlling said eye pattern comprises obtaining an eye opening in said eye pattern by controlling a spacing between decision points to be accommodated in said eye opening.

26. The waveform optimization method for an optical data signal as set forth in claim 9, further comprising:

detecting said eye opening in the eye pattern of a data signal based art discrimination information concerning the data signal from said clock and data recovery circuit; and controlling the dispersion characteristics of said dispersion equalizer as appropriate according to the size of said eye opening such that the error count in said data signal will be minimized.

27. The waveform optimization method for an optical data signal as set forth in claim 26, further comprising:

obtaining the size of the eye opening sufficient for three decision points on a time base of the eye pattern, said points comprising a left decision point, a central decision point and a right decision point, to be accommodated in said eye opening by way of controlling a spacing between adjacent decision points; and controlling a dispersed value of said dispersion equalizer to achieve an optimum value of said dispersed value by increasing or decreasing said dispersed value as appropriate according to said size of the eye opening thus obtained.

28. The waveform optimization method for an optical data signal as set forth in claim 27, wherein said controlling said dispersed value comprises:

comparing current and previous sizes of the eye opening, and increasing or decreasing the dispersed value of said dispersion equalizer as appropriate according to an increase or decrease in said size of the eye opening.

29. The waveform optimization method for optical data signal as set forth in claim 27, wherein said controlling said dispersed value comprises:

comparing current and previous sizes of the eye opening; incrementing the dispersed value of said dispersion equalizer by a first pre-determined value if said size of the eye opening has increased; and decrementing the dispersed value of said dispersion equalizer by a second pre-determined value if said size of the eye opening has decreased.

30. The waveform optimization method for an optical data signal as set forth in claim 27, wherein said controlling said dispersed value comprises;

comparing current and previous sizes of the eye opening, and according to an increase or decrease in said size of the eye opening;

performing a first process of increasing or decreasing the dispersed value of said dispersion equalizer; and performing a second process of inversing the increasing or decreasing of the dispersed value of said dispersion equalizer.

31. The waveform optimization method for an optical data signal as set forth in claim 27, wherein said controlling said dispersed value comprises:

comparing current and previous sizes of the eye opening; incrementing the dispersed value of said dispersion equalizer if said size of the eye opening has increased;

decrementing the dispersed value of said dispersion equalizer if said size of the eye opening has decreased; and when said dispersed value is to be increased, decreasing an incremental value of said dispersed value stepwise as appropriate according to the increase in the size of said eye opening.

32. The waveform optimization method for an optical data signal as set forth in claim 27, wherein said controlling said dispersed value comprises:

comparing current and previous sizes of the eye opening; and upon a change in a direction of increase or decrease in said size of the eye opening changes, switching between a first process of incrementing the dispersed value of said dispersion equalizer by a pre-determined value and a second process of decrementing the dispersed value of said dispersion equalizer by a pre-determined value.

* * * * *